United States Patent
Marks et al.

(10) Patent No.: US 8,349,222 B2
(45) Date of Patent: Jan. 8, 2013

(54) TWISTED π-ELECTRON SYSTEM CHROMOPHORE COMPOUNDS WITH VERY LARGE MOLECULAR HYPERPOLARIZABILITIES AND RELATED COMPOSITIONS AND DEVICES

(75) Inventors: Tobin J. Marks, Evanston, IL (US); Hu Kang, Evanston, IL (US)

(73) Assignee: Northwestern University, Evanston, IL (US)

( * ) Notice: Subject to any disclaimer, the term of this patent is extended or adjusted under 35 U.S.C. 154(b) by 0 days.

(21) Appl. No.: 13/169,638

(22) Filed: Jun. 27, 2011

(65) Prior Publication Data
US 2011/0278512 A1 Nov. 17, 2011

Related U.S. Application Data

(62) Division of application No. 12/814,966, filed on Jun. 14, 2010, now Pat. No. 7,968,016, which is a division of application No. 11/389,429, filed on Mar. 24, 2006, now Pat. No. 7,824,582.

(60) Provisional application No. 60/665,038, filed on Mar. 24, 2005.

(51) Int. Cl.
*G02B 5/23* (2006.01)
*F21V 9/00* (2006.01)

(52) U.S. Cl. ........ 252/586; 252/582; 359/245; 359/326; 359/328; 385/131; 385/143; 210/656

(58) Field of Classification Search ................... 210/656; 252/586, 582; 359/245, 326, 328; 385/131, 385/143
See application file for complete search history.

(56) References Cited

U.S. PATENT DOCUMENTS
6,067,186 A * 5/2000 Dalton et al. ............... 359/321
2006/0237368 A1 10/2006 Marks et al.
2007/0237442 A1 10/2007 Marks et al.

OTHER PUBLICATIONS

Thomas Zimmermann, Ring transformations of heterocyclic compounds. X[1]. A simple method for the conversion of methyl substituted pyridinium salts into 2,4,6-triarylphenyl derivatives: the first (thio)pyrylium ring transformations with heterocyclic anhydrobases as carbon nucleophiles, Journal of Heterocyclic Chemistry (1995), 32(2), 563-7.*
Keinan, et al., "Twisted pi-system electro-optic chromophores. A CIS vs. MRD-CI theoretical investigation," Journal of Molecular Structure (Theochem) 633 (2003) 227235, Aug. 29, 2003, p. 228, chart 1, abstract, p. 233, col. 1.
Albert, IDL; Marks, TJ; Ratner, MA. Conformationally-Induced Geometric Electron Localization. Interrupted Conjugation, Very Large Hyperpolarizabilities, and Sizable Infrared Absorption in Simple Twisted Molecular Chromophores; J. Am. Chem. Soc., 1997, pp. 3155-3156, vol. 119.
Galvan-Gonzalez, A; Belfield, KD; Stegman, GI; Canva; M; Marder, SR; Staub, K; Levina, G; Twieg, RJ. Photodegradation of Selected π-Conjugated Electro-Optic Chromophores; Journal of Applied Physics, Jul. 1, 2003, pp. 756-763, vol. 94, No. 1.
Marder, SR; Beratan, DN; Cheng, LT. Approaches for Optimizing the First Electronic Hyperpolarizability of Conjugated Organic Molecules; Science, Apr. 5, 1991, pp. 103-106; vol. 252, No. 5002.
Keinan, S; Zojer, E; Brédas, JL; Ratner, MA; Marks, TJ. Twisted π-System Electro-Optic Chromophores. A CIS vs. MRD-CI Theoretical Investigation; Journal of Molecular Structure: THEOCEHM, Aug. 29, 2003, 227-235, vol. 633, Issues 2-3.
Albert, IDL; Marks, TJ; Ratner, MA. Remarkable NLO Response and Infrared Absorption in Simple Twisted Molecular π-Chromophores; J. Am. Chem. Soc., 1998, pp. 11174-11181, vol. 120.

* cited by examiner

*Primary Examiner* — Bijan Ahvazi
(74) *Attorney, Agent, or Firm* — Reinhart Boerner Van Deuren s.c.

(57) ABSTRACT

Unconventional twisted π-electron system electro-optic (EO) chromophores/compounds, compositions and related device structures. Crystallographic analysis of several non-limiting chromophores reveals, for instance, large ring-ring dihedral twist angles and a highly charge-separated zwitterionic structure in the ground state, in both solution phase and solid-state.

6 Claims, 10 Drawing Sheets

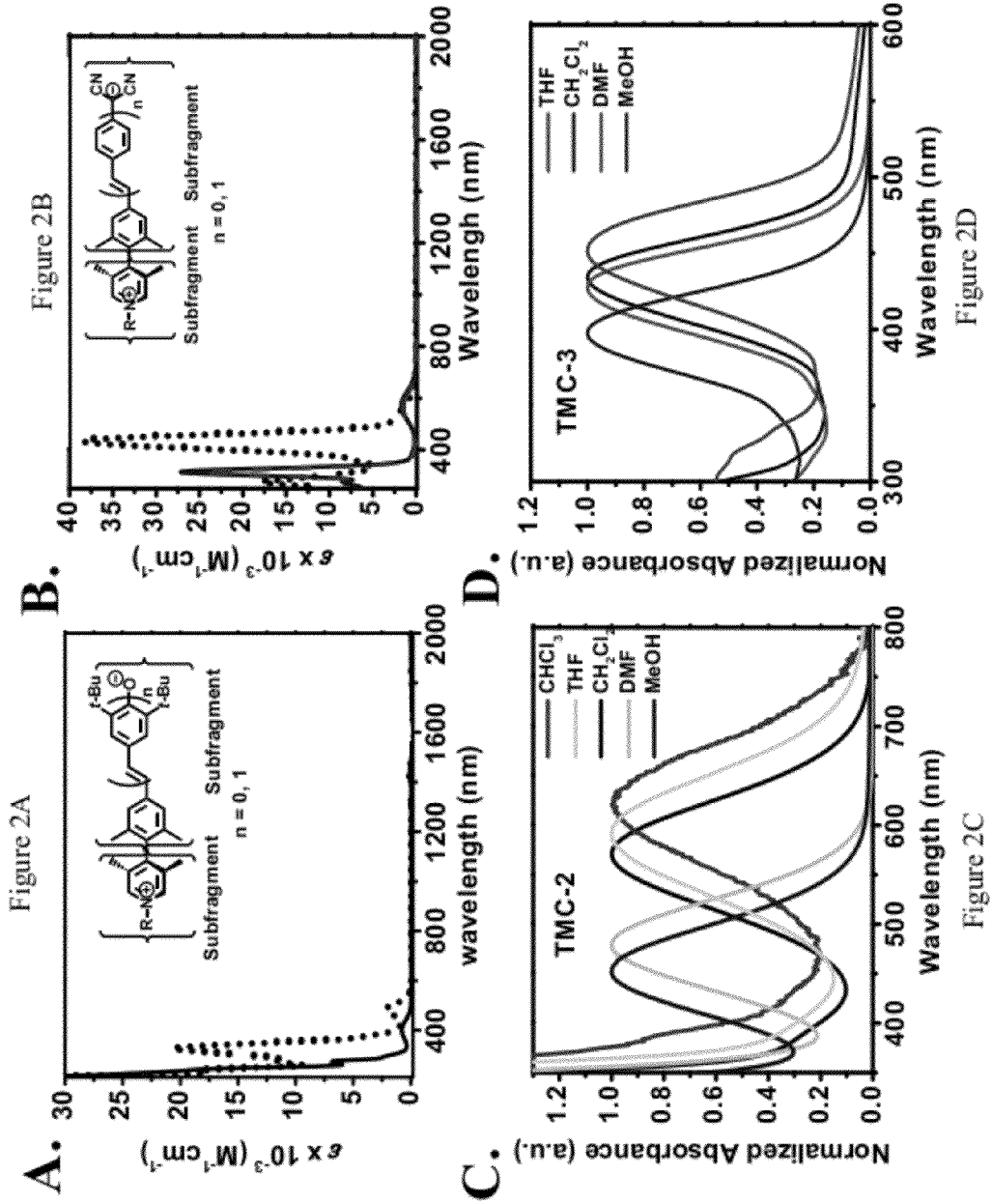

Figure 4A
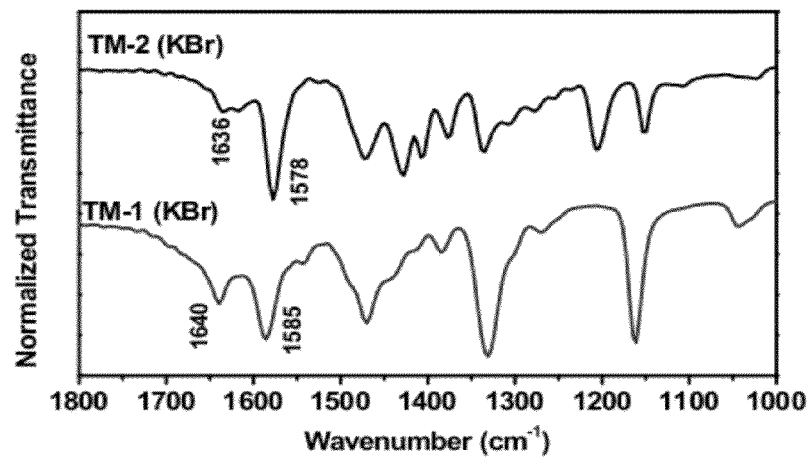
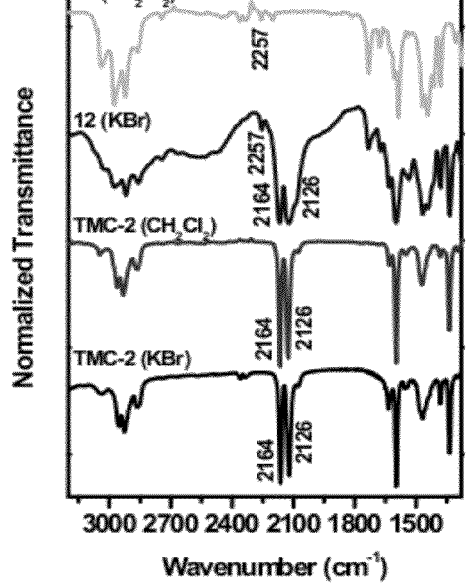
Figure 4B
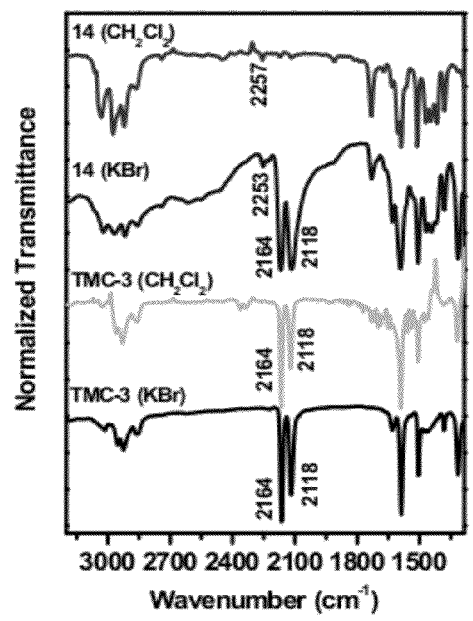
Figure 4C

Figure 5A
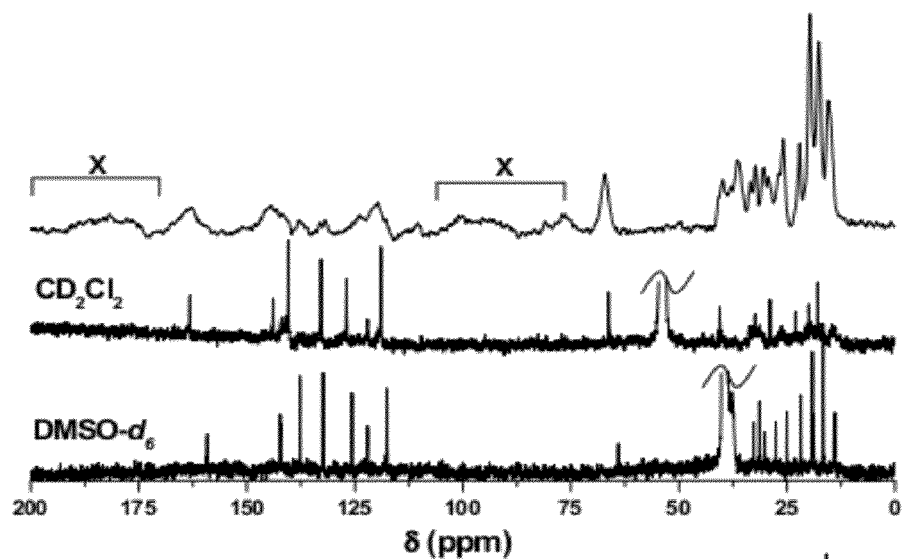
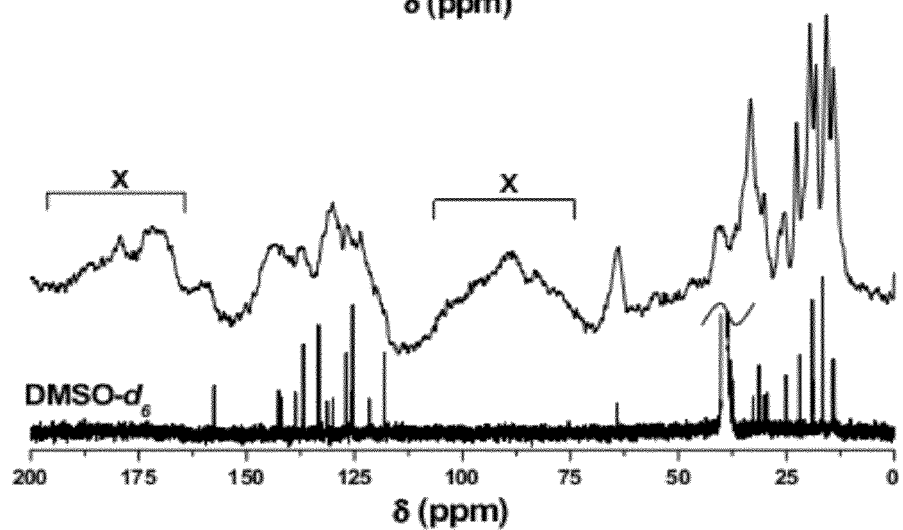
Figure 5B

Figure 7A
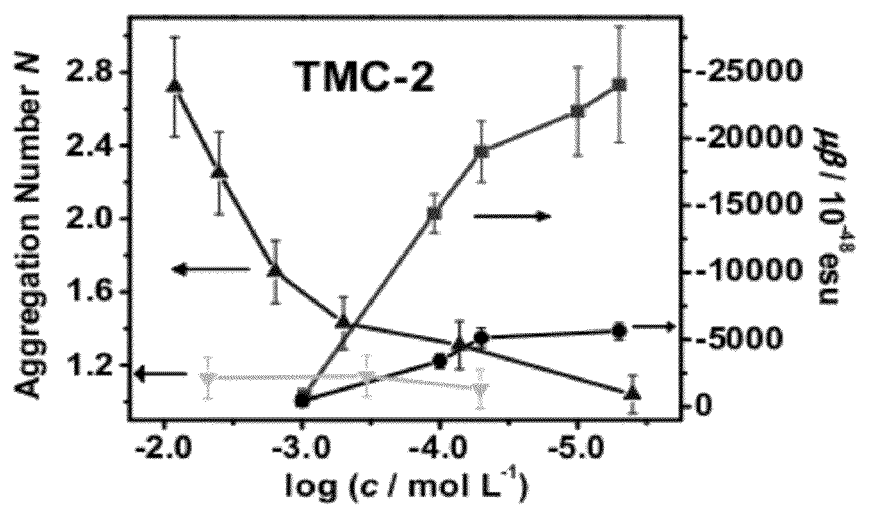
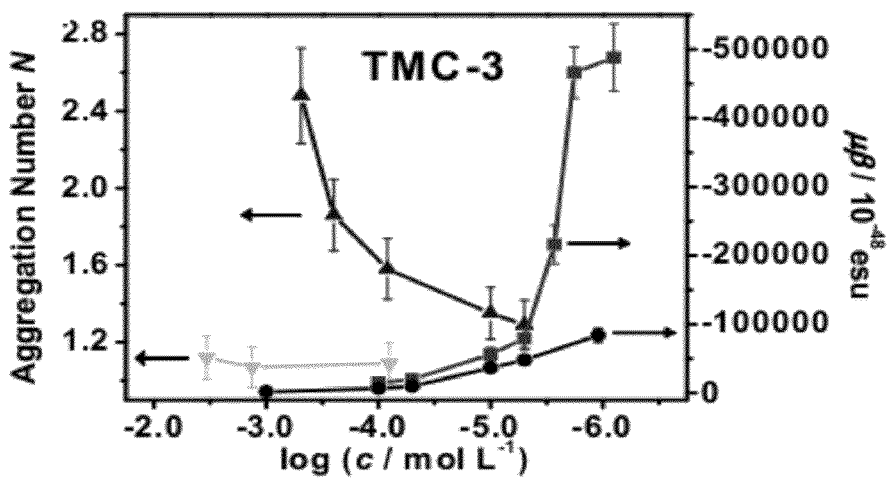
Figure 7B

TWISTED π-ELECTRON SYSTEM CHROMOPHORE COMPOUNDS WITH VERY LARGE MOLECULAR HYPERPOLARIZABILITIES AND RELATED COMPOSITIONS AND DEVICES

This application is a divisional of and claims priority benefit from application Ser. No. 12/814,966 filed Jun. 14, 2010, U.S. Pat. No. 7,968,016 issued Jun. 28, 2011, which is a divisional of and claims priority benefit from application Ser. No. 11/389,429 filed on Mar. 24, 2006, U.S. Pat. No. 7,824,582 issued Nov. 2, 2010 which claims priority to provisional application Ser. No. 60/665,038, filed on Mar. 24, 2005, the entirety of which is incorporated herein by reference.

This invention was made with government support under Grant Number N00014-04-1-0093 awarded by the Office of Naval Research and under Grant Number DMR-0076077 awarded by the National Science Foundation. The government has certain rights in the invention.

BACKGROUND OF THE INVENTION

The development of high-performance molecule-based electro-optic (EO) materials has been the focus of much current research. Such materials are of great scientific and technological interest not only for applications as diverse as optical telecommunications, signal processing, data storage, image reconstruction, logic technologies, and optical computing, but also for the fundamental understanding how matter interacts with light. The essential requirement for large bulk EO response is that the active component chromophore has a large microscopic molecular first hyperpolarizability tensor ($\beta$), and the quest for such chromophores has been a very active research field. To date, the vast majority of effective EO chromophores have been devised according to very similar design principles: planar conjugated π-electron systems end-capped with electron donor and acceptor (D, A) moieties. This design algorithm gives rise to a dominant intramolecular charge-transfer (ICT) transition from the ground state to first excited state and produces effective polarization along the π-conjugated axis. Considerable efforts have been directed toward the molecular engineering of such chromophore structures, and a variety of strategies has emerged within the framework of the classical "two-state model" for molecular hyperpolarizability. This simple model invokes a neutral ground state and a charge separated first excited state, where $\beta$ is determined by the energy gap between the two states ($\Delta E_{ge}$), the transition dipole moment ($\mu_{ge}$) between the two states, and the difference in the dipole moment between the two states ($\Delta\mu_{ge}=\mu_{ee}-\mu_{gg}$) (eq 1).

$$\beta = 3\Delta\mu_{ge}(\mu_{ge})^2/(\Delta E_{ge})^2 \qquad (1)$$

One approach, described in terms of "bond length alteration" (BLA), the difference between average single and double bond lengths in the conjugated chromophore core, argued that BLA, hence $\beta$, can be optimized by controlling the relative neutral and charge-separated contributions to the ground state via modifying D/A constituent strength, the polarity of the solvent, or the strength of an applied electric field. Another model, "auxiliary donors and acceptors", correlates molecular hyperpolarizability with the electron density of the π-conjugation, arguing that electron excessive/deficient heterocycle bridges act as auxiliary donors/acceptors, and lead to substantial increases in $\beta$ values. Directed by these strategies, the largest hyperpolarizabilities have, to date, been observed with protected polyene and/or multiple (including fused) thiophene ring-containing bridges (e.g., CLD and FTC), with the chromophore figures-of-merits, $\mu\beta$ ($\mu$=the molecular dipole moment), as high as 35,000× $10^{-48}$ esu being achieved.

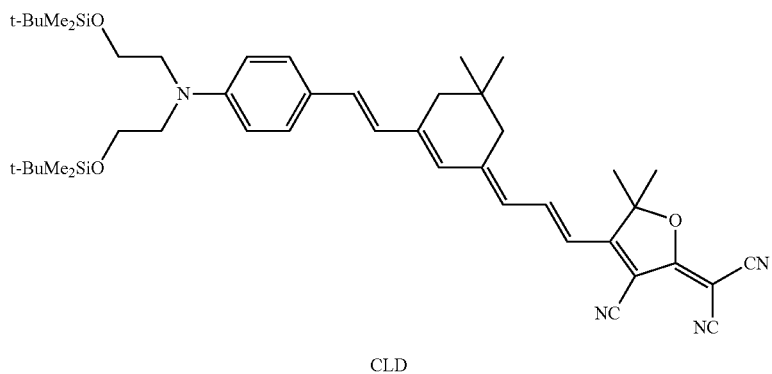

CLD

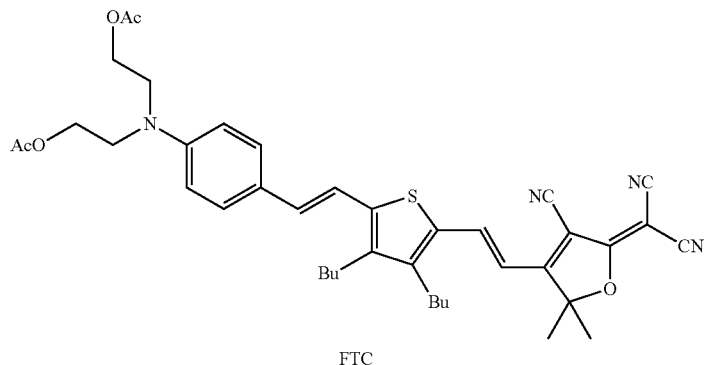

FTC

-continued

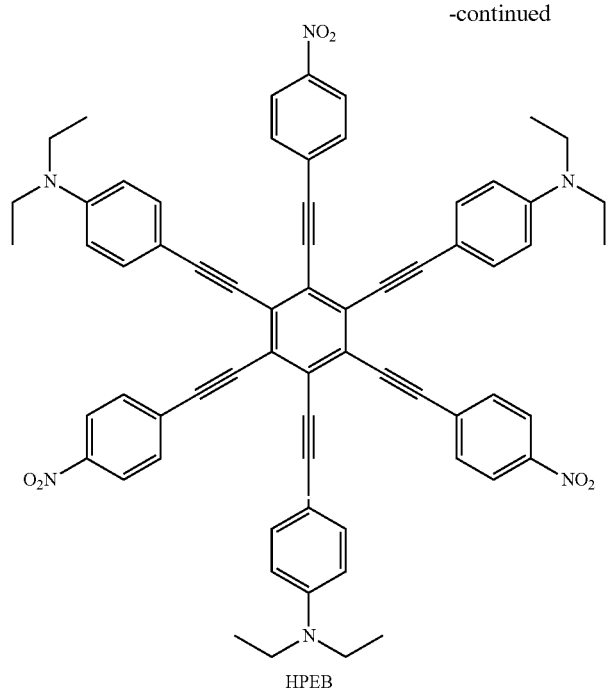

HPEB

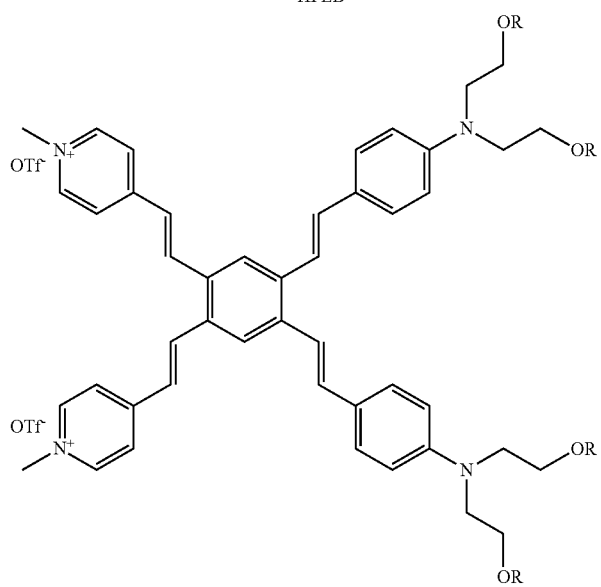

X-CHR

PCTE

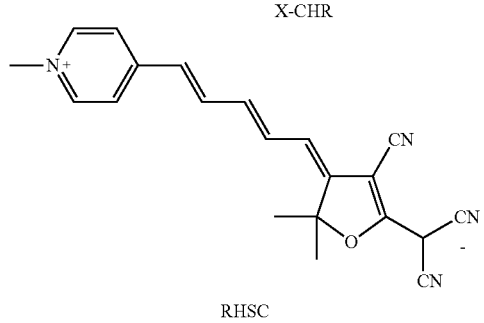

RHSC

Note that such strategies focus primarily on extensive planar π-conjugation, and such molecules are inherently structurally complex, complicating synthetic access, and introducing potential chemical, thermal, and photochemical frailties. Furthermore, extended conjugated systems typically introduce bathochromic shifts in optical excitation, thus eroding transparency at the near-IR working wavelengths for many photonic applications. Other β enhancement strategies have emerged recently, including multi-dimensional charge-transfer chromophores (e.g., HPEB and X—CHR), and a class of "right-hand-side" zwitterionic chromophores (e.g., PCTE and RHSC). These chromophores exhibit improved transparency and stability, but not significant enhancement in hyperpolarizability.

As suggested in the literature the β responses of all known organic EO chromophores, for reasons that are presently not clear, fall far short of the fundamental quantum limits by a factor of $\sim 10^{-3/2}$. As a result alternative paradigms for very large-β chromophores remains an ongoing concern in the art, with growing evidence that simple two-state systems are inadequate.

Twisted intramolecular charge-transfer (TICT) molecules have recently received considerable attention in the quest to understand their nonlinear optical response. In TICT mechanisms, rotation about a bond connecting conjugated D/A substituents can decouple the orbitals of the D/A groups. Nearly complete electron transfer can occur, strongly enhancing CT interactions and leading to large hyperpolarizabilities. However, electron transfer is induced upon optical excitation, but not observed in the ground state. Further, such structures tend to be complex and prone to thermal/oxidative/photochemical degradation.

SUMMARY OF THE INVENTION

In light of the foregoing, it is an object of the present invention to provide a range of π-electron chromophore compounds, compositions, device structures and/or methods for their use, thereby overcoming various deficiencies and shortcomings of the prior art, including those outlined above. It would be understood by those skilled in the art that one or more aspects of this invention can meet certain objectives, while one or more other aspects can meet certain other objectives. Each objective may not apply equally, in all its respects, to every aspect of this invention. As such, the following objects can be viewed in the alternative with respect to any one aspect of this invention.

It can be an object of this invention to provide a range of π-system chromophore compounds and related compositions, exhibiting hyperpolarizabilities heretofore unrealized, through design and synthetic strategies contrary to the art.

It can be another object of the present invention to provide such compounds and related compositions with hyperpolarizability and linear optical response as can be determined through choice and selection of compound moieties and substituents.

It can be another object of the present invention to compositionally provide one or more such chromophore compounds with a polymeric component, for optional incorporation of such compounds into a range of electro-optic component and device structures.

Other objects, features, benefits and advantages of the present invention will be apparent from this summary and the following descriptions of certain embodiments, and will be readily apparent to those skilled in the art having knowledge of various electro-optic devices, their fabrication and material choice. Such objects, features, benefits and advantages will be apparent from the above as taken into conjunction with the accompanying examples, data, figures and all reasonable inferences to be drawn thereforom, alone or with consideration of the references incorporated herein.

In part, the present invention can comprise a chromophore compound of a formula

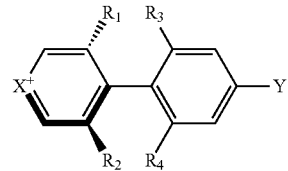

together with salts, conjugate acids and charge-transfer isomers thereof. In such a compound, X can be selected from NR', O and S. Each of R' and $R_1$-$R_4$. can be independently selected from linear alkyl, substituted linear alkyl, branched alkyl, substituted branch alkyl, cycloalkyl and substituted cycloalkyl, aryl, heterocyclic, alkylaryl, alkylheterocycle, and arylheterocycle moieities. Such moieties can be heteroatom-substituted (e.g., without limitation, dialkyl ether, etc.) or substituted with a functional group, as would be understood by those skilled in the art, such substitution limited only by synthetic technique and available starting materials. Likewise, either or both aryl (e.g., phenyl and heterocyclic) components of such a compound can be further substituted, at another position(s) thereon, with any such or related moiety. Regardless, in certain embodiments, each of $R_1$-$R_4$ can be independently selected from a $C_nH_{2n+1}$ moiety, where n can be an integer selected from 1 and integers greater than 1. In certain other embodiments, any such moiety can comprise an electron-withdrawing substituent. Representative of such embodiments, any one of the $R_1$-$R_4$ moieities can comprise one or more fluoro substituents. Without limitation, in various such embodiments, X can be NR'. Likewise, without limitation, R' can be selected from linear alkyl and branched alkyl moieties.

Regardless, Y can comprise a substituent comprising a moiety selected from a range of anionic carbon and heteroatom moieties. As mentioned above, the compounds of this invention can comprise corresponding salts, without limitation as to counter ion and conjugate (i.e. protonated) acids. As discussed more fully below, such compounds can have a zwitterionic character, as can be evidenced by a formal charge separation or a degree thereof.

In such compounds, without limitation as to X, R' or $R_1$-$R_4$, Y can be a substitutent such that the corresponding aryl component comprises a phenoxide. In certain other embodiments Y can be a methanide moiety, as can be mono- or disubstituted with a substituent understood in the art to have a degree of electron-withdrawing character. Representative electron-withdrawing substituents (Ew) include but are not limited to cyano, nitro, alkyl or phenyl sulfate, fluoro-substituted alkyl, and phenyl or alkylcarbonyl.

In certain other embodiments, without limitation as to identity of X or any of $R_1$-$R_4$, Y can comprise a substituent of a formula

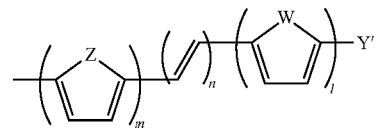

where Y' can be selected from any moiety discussed above or described elsewhere herein. Regardless, z and w can be independently selected from S, O, NR" and CH=CH, and R" can be selected from linear alkyl, substituted linear alkyl, branched alkyl, substituted branched alkyl, cycloalkyl and substituted cycloalkyl moieties. Any such moiety can be substituted as described above or as would be understood by those skilled in the art. Regardless, m, n and l can be independently selected from 0 and integers greater than 0, provided that for such embodiments at least one of m, n, and l is at least 1.

In part, this invention can also comprise a chromophore compound of a formula

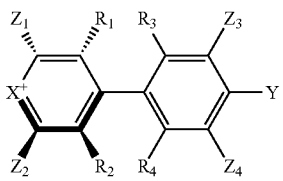

together with salts, conjugate acids and charge-transfer isomers thereof. Each of $Z_1$-$Z_4$ can be independently selected from moieties of the sort described above in conjunction with $R_1$-$R_4$. Further, such moieties can be substituted, as also discussed above. Alternatively, from a functional perspective, any one or more of such Z moieties can be selected in view of corresponding steric considerations and related structural features imparted to such a compound. Accordingly, such moieties as can be used to reduce, impede and/or block compound aggregation of the sort discussed below. Other variables (e.g., X and Y, etc.) can be discussed above.

In part, this invention can also comprise a chromophore compound of a formula

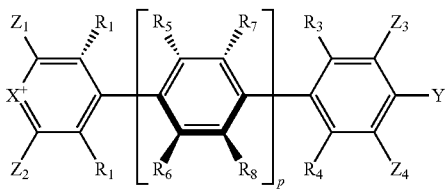

together with salts, conjugate acids and charge-transfer isomers thereof. Each of $R_5$-$R_8$ can be independently selected from moieties of the sort discussed above in conjunction with $Z_1$-$Z_4$ and $R_1$-$R_4$. Alternatively, from a functional perspective and as discussed more fully below in conjunction with $R_1$-$R_4$, any one or more of $R_5$-$R_8$ can be selected in view of corresponding steric considerations and related structure features pmparted to such a compound. Accordingly, such moieties can be selected as to induce out-of-plane orientation with respect to adjacent aryl components, as can be characterized by a corresponding dihedral angle up to about 90°, depending on choice and identity of any $R_5$-$R_8$. Regardless of identity, p can be selected from 0 and integers greater than 0, any one or more of such moieties as can be intermediate to or couple aryl moieties of the sort discussed above. Other variables (e.g., X and Y, etc.) can be as discussed above.

Any such chromophore compound, of the sort discussed herein, can be a component of a composition comprising a polymer component. Such compositions are limited only by synthetic technique, component compatability and resulting physical and functional characteristics. In certain embodiments, a polymeric component can comprise poly(vinylphe-nol). In certain other embodiments, a polymeric component can be selected from one or more polymers providing a relatively high glass transition temperature, $T_g$, as would be understood by those skilled in the art. Such polymers can comprise one or more polyimides, one or more polyacrylates, one or more polycarbonates, and/or one or more polysulfones or copolymers thereof. Any such composition can be prepared and fabricated to provide a polymeric thin film, such thin films as can be deposited on, connected with, or coupled to a substrate, the material choice of which can be selected depending upon end-use application or incorporation into a corresponding device structure.

Accordingly, in part, this invention can also comprise an electro-optic device. Such a device can comprise a substrate and a chromophore-polymeric composition of the sort discussed above. Such compositions are limited only by available chromophore and polymer components, resulting physical and functional characteristics and use thereof in conjunction with a suitable substrate. In certain non-limiting embodiments, such a composition can be provided as a polymeric film, comprising e.g. poly(vinylphenol) or another of the aforementioned range of polymeric components. Regardless of chromophore or polymer identity, such a composition, using fabrication techniques well-known in the art, can be deposited on, connected with or coupled to a substrate suitable for incorporation into a particular device structure. In certain embodiments such substrates can comprise a transparent conducting oxide. The preparation and availability of such materials are well known in the art, as illustrated by use of indium oxide, indium tin-oxide and various dopant-substituted variations thereof.

In part, this invention can also be directed to a method of using steric factors to induce molecular polarizability. With reference to the aforementioned compounds and synthetic techniques described herein, such a method can comprise providing an aryl electron acceptor component at least meta-disubstituted about a reaction site; providing an aryl electron donor component at least meta-disubstituted about a reaction site; and coupling the donor and acceptor components at the reaction site, whereby the donor and acceptor substitution induce a dihedral angle between the aryl components. As illustrated below, in certain embodiments, the aryl components can have an out-of-plane orientation one to another characterized by a dihedral angle up to about 90°, depending upon selection of any one of the aforementioned $R_1$-$R_4$ moieties. As illustrated below, the hyperpolarizabailities available through this invention can be achieved regardless of the π-electron system. Nonetheless, in certain embodiments, the coupled donor and acceptor components can be charged, with the dihedral angle promoting zwitterionic structure and formal charge separation. In certain such embodiments, the acceptor component can comprise a pyridinium moiety. In some such and certain other embodiments, the donor component can comprise phenoxide or methanide moieties, the latter as can be substituted as discussed above.

More generally, this invention can relate to compounds comprising zwitterionic twisted π-electron systems, joining D/A moieties and related substituents, which exhibit unprecedentedly large hyperpolarizabilities. Both the molecular hyperpolarizability and linear optical energy are widely tunable by selection and incorporation of sterically-encumbered substituents to modify interplanar dihedral angle (θ). Without limitation to any one theory or mode of operation, the tunable structural characteristic that promotes exceptional nonlinear optical response is believed to relate to sterochemically-enforced reduction in D-π-A conjugation, leading to aromatic stabilization that in turn enforces a ground state with formal charge-separated zwitterionic character, a relatively low-energy intramolecular optical excitation, and a large change in dipole moment from the ground to first excited state. As a consequence, as a further distinction over the prior art, compounds with relatively small numbers of π-electrons can exhibit responses far larger than those having conventional planar π-conjugated chromophores. For example, in certain embodiments, such compounds can comprise two directly-bonded arene rings, structures far less susceptible to thermal/oxidative degradation concerns typical in the art.

As detailed below, this invention provides the first synthetic realization of twisted π-electron system chromophores (tictoids), together with various synthetic approaches, solid state and solution characterization, structural characteristics, optical/IR spectroscopic properties relevant to understanding electronic structure, aggregation behavior, and the exceptional NLO/EO properties of this unconventional tictoid chromophore family (e.g., TM and TMC, in Chart 1, below). Molecular hyperpolarizabilities as high as 15× greater than ever previously reported (e.g., $\mu\beta$ as high as $-488,000\times10^{-48}$ esu at 1907 nm) can be achieved. Likewise, poled polymers with EO responses 3-5× greater than achieved heretofore ($r_{33}$ as high as 330 pm/V at 1310 nm) are also available. Such results demonstrate a new paradigm for molecular hyperpolarizability and organic electro-optics.

BRIEF DESCRIPTION OF THE DRAWINGS

FIGS. 2A-D. (A) Optical absorption spectra of TM chromophores in methanol solution. Solid line: TM-1; dotted line: TM-2, (B) Optical absorption spectra of TMC chromophores in $CH_2Cl_2$ solution. Dashed line: TMC-1; solid line: TMC-2; dotted line: TMC-3, (C) Optical absorption spectra of TMC-2 in different solvents. Only inter-fragment CTs band are shown here. (D) Optical absorption spectra of TMC-3 in solvents of varying polarity. Inter- and intra-fragment excitation bands are overlapped.

FIGS. 4A-C. (A) IR spectra of chromophores TM-1 and TM-2 as KBr pellets. (B) IR spectra of TMC-2 and its neutral precursor 12 in a KBr pellet and in $CH_2Cl_2$ solution. (C) IR spectra of TMC-3 and its neutral precursor 14 in a KBr pellet and in $CH_2Cl_2$ solution.

FIGS. 5A-B. (A) $^{13}C$ NMR spectra of chromophore TMC-2 in solid state (top), in $CD_2Cl_2$ (middle), and in DMSO-$d_6$ (bottom). (B) $^{13}C$ NMR spectra of chromophore TMC-3 in solid state (top) and in DMSO-$d_6$ (bottom). X=spinning sidebands.

FIGS. 7A-B. Comparative PGSE NMR-derived aggregation number (N, left scale) data and EFISH-derived μβ data (right scale) as a function of concentration for twisted chromophores TMC-2 (A) and TMC-3 (B). PGSE NMR data are obtained from $CD_2Cl_2$ (▲) and DMSO-$d_6$ (▼) solutions. EFISH measurements are performed in $CH_2Cl_2$ (■) and DMF (●) solutions. Lines are drawn as guides to the eye. c=concentration.

DETAILED DESCRIPTIONS OF CERTAIN EMBODIMENTS

Figure 1A:
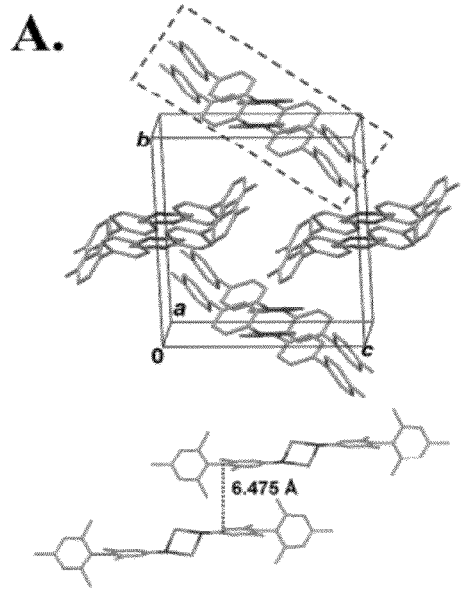
FIGS. 1A-D. Crystal packing diagrams of representative chromophores TM-1 (A), TM-2 (B), TMC-1 (C), and TMC-2 (D). A single dimeric or tetrameric unit is indicated by the dashed lines and shown at bottom. The two independent molecules in TMC-1 asymmetric unit are indicated by symmetry equivalence. Solvent molecules, tetra-o-methyl substituents (A, top), and N-alkyl chains (D, top) are removed for clarity.
Figure 1B:
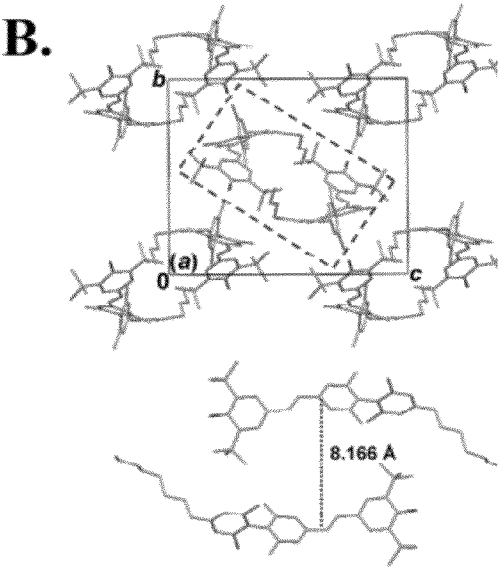

As outlined above, this invention provides a new series of tictoid chromophores. Of particular interest here are the enforced dihedral twist angles and related structural characteristics that define the architectures of such zwitterions. To this end, single-crystal X-ray structure determinations are performed on a number of the target chromophores as well as their synthetic precursors (including neutral, positively charged, and zwitterionic molecules) to provide structural information in solid state. Such a tetra-ortho-methylbiaryl substitution pattern indeed enforces very large and uniform twist angles over the series, and tictoid chromophores possess highly charge-separated zwitterionic groundstates in the solid state. Molecular properties and structural characteristics in solution are then studied by a combination of techniques, including optical absorption (UV-vis), fluorescence, cyclic voltammetry, and vibrational infrared (IR) spectroscopy. It is further shown that the dihedral twist angle and structural characteristics observed in the solid state persist in the solution phase by comparative solid-state vs. solution $^{13}C$ NMR, IR, and optical spectroscopic studies.

To understand in-depth how aggregation of these highly dipolar zwitterions may affect chromophore measured linear/nonlinear optical properties, the solution phase molecularity is fully investigated using several complementary experimental techniques, including concentration-dependent optical, fluorescence, and pulsed field gradient spin-echo (PGSE) NMR spectroscopies, in comparison with solid state X-ray diffraction data. These studies reveal clear evidence of the formation of centrosymmetric aggregates at high concentrations in non-polar solvents and in the condensed state, and provide quantitative information on the state of aggregation. Finally, molecular hyperpolarizabilities are evaluated by the solution-phase DC electric-field-induced second-harmonic generation (EFISH) methods, and the electro-optic coefficients ($r_{33}$) of host-guest poled polymers containing these chromophores are directly measured by Teng-Man reflection techniques. Aggregation effects on these measurements are also taken into account and discussed.

The syntheses of the present new families of tictoid chromophores are summarized in Chart 1 and Scheme 1, below. Highly encumbered asymmetric tetra-ortho-methylbiaryl core 3 was synthesized via Suzuki cross-coupling of hindered 4-bromopyridine N-oxide 1 and phenyl boronic acid 2, using a Pd/dicyclohexyl-(2-phenanthren-9-yl-phenyl)-phosphane (DCPPP) catalyst. Pyridine N-oxide 3 was next reduced to pyridine 4 in a facile and quantitative fashion using Pd-catalyzed hydrogenation with sodium hypophosphite as the hydrogen source. Subsequent cleavage of the 4 methoxyl group with pyridine+HCl affords pyridylphenol intermediate 6. This product was then quaternized with methyl iodide and deprotonated with sodium methoxide to afford chromophore TM-1. N-methylpyridinium salts 5 and 7 were also prepared for X-ray diffraction studies.

The crucial synthetic intermediate biaryl iodide 11 was prepared via a four-step phenol-to-aryl iodide conversion. The phenol 6 was first converted to triflate 8. Next, Pd-catalyzed coupling of triflate 8 with benzophenone imine leads to diphenyl ketimine 9 in 98% yield. Subsequent quantitative hydrolysis of 9 to primary aniline 10 was achieved using hydroxylamine hydrochloride. Biaryl iodide 11 was then obtained via diazotization of 10 and iodination of the corresponding diazonium salt with NaI. The chromophore TM-2 was synthesized via the conventional Heck cross-coupling of 11 and styrenic coupling partner 12 (as can optionally be substituted with any of $R_1$-$R_8$ discussed above), which was readily obtained via thermal decarboxylation of 3,5-di-tert-butyl-4-hydroxycinnamic acid in DMF. The resulting stilbene precursor 13 was quaternized with n-octyl iodide and then deprotonated with sodium methoxide to afford chromophore TM-2 in 87% yield.

Pd-catalyzed coupling of 11 with sodium dicyanomethanide affords 15 in high yield (96%), which is next regioselectively N-quaternized by alkyl triflates and then deprotonated to afford TMC-1 (80% yield) and TMC-2 (67% yield). Styrene precursor 18 was synthesized via Pd-catalyzed coupling of 1-iodo-4-vinyl-benzene with sodium dicyanomethanide in 72% yield. Subsequent Heck-coupling of 11 with styrene 18 affords chromophore precursor 19 in 55% yield. This intermediate was alkylated and then deprotonated to afford chromophore TMC-3 in 66% yield. All new compounds have been fully characterized via conventional analytical/spectroscopic techniques, including multinuclear NMR spectroscopy, mass spectrometry and elemental analysis.

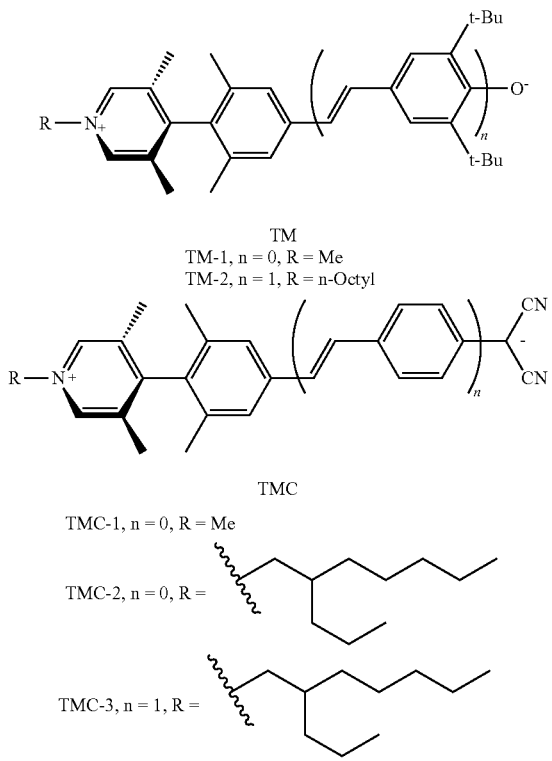

Chart 1

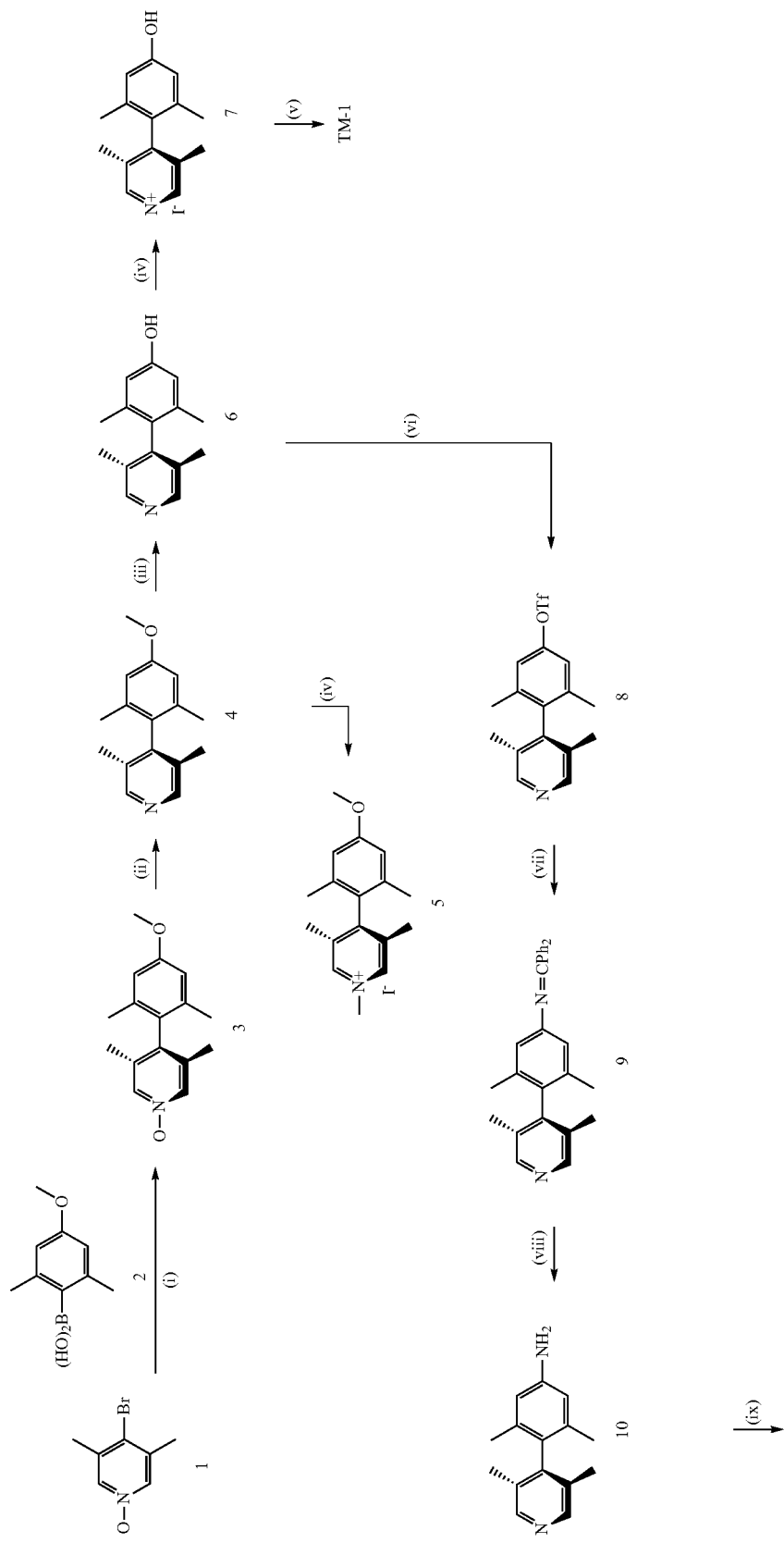
Scheme 1. Synthesis of twisted π-electron system chromophores.[a]

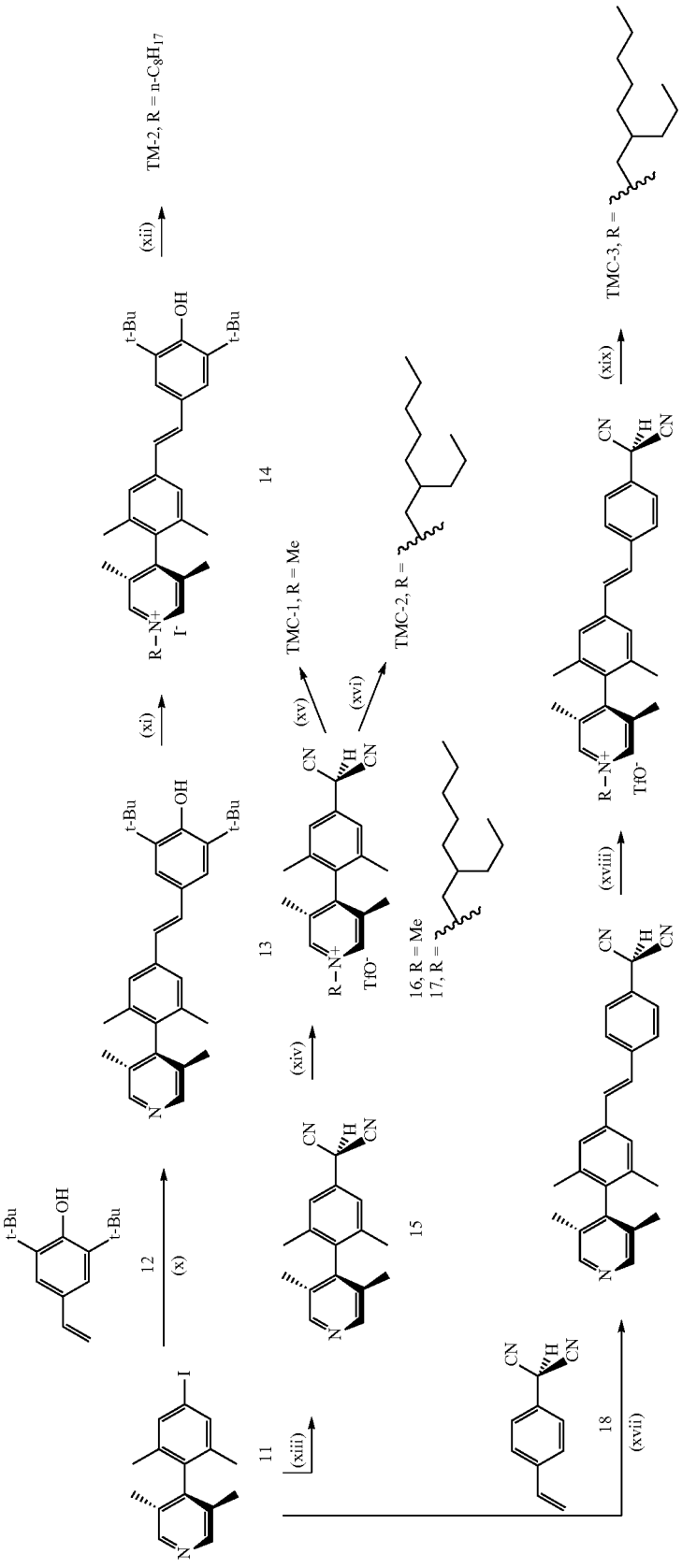

In accordance with the preceding, various other compounds can be prepared in an analogous fashion using comparable synthetic techniques or straightforward modifications thereof, as would be understood by those skilled in the art. For instance, biaryl-type compounds (e.g., heterocyclic-phenyl, etc.), whether or not coupled by one or more phenyl moieties, comprising a pyrylium (X=O), a thiopyrylium (X=S) or a phosphopyrylium (X=PR') moiety can be prepared from appropriate starting materials using synthetic procedures of the sort described in Scheme 1. Likewise such compounds, together with pyridinium analogs of the sort described above, can be substituted at either or both positions (e.g., $Z_1$ and/or $Z_2$, above) ortho to the heteroatom (or meta to the reaction site), such substituents as can be selected from those previously described in conjunction with $R_1$-$R_4$ and $R_5$-$R_8$. Such compounds are also available and prepared, as known in the art using related synthetic techniques or modifications thereof. For instance, one or more (e.g., p, above) phenyl moieties (substituted e.g., $R_5$-$R_8$, as described above) can couple the aryl components, using straightforward variations of the procedures described in conjunction with Scheme 1. Similarly, another aryl moiety can be substituted at one or both positions (e.g., $Z_3$ and/or $Z_4$, above) ortho to Y, e.g., O$^-$ or (NC)$_2$C$^-$ (or meta to the reaction site) through use of appropriately substituted starting materials. Also, where Y comprises an extended π-electron system, such moieties can be as would be understood in the art, using comparable synthetic techniques or modifications thereof. For instance, Stille-type coupling of suitably-functionalized styrenic intermediate 12 (Scheme 1) with an appropriate substituted or unsubstituted phenyl or heterocyclic (e.g., thiophene, pyrole, furan, etc.) moiety for coupling with such a biaryl component.

X-ray diffraction structural analysis was performed on neutral synthetic intermediates 3 and 6, N-methylpyridinium salts 5 and 7, and tictoid chromophores TM-1, TM-2, TMC-1, and TMC-2. Single crystals were obtained via slow evaporation of saturated solutions. The ORTEP drawings of the molecular structures, selected bond lengths, and inter-ring twist dihedral angles are summarized in Table 1. All of these molecules exhibit the consistently large arene-arene dihedral twist angles (80°-89°). The (ring)C—C(ring) distances in these molecules are slightly longer than in typical biaryls (~1.487 Å),[32] and close to that in bimesityl (1.505(2) Å), doubtless a result of the pronounced steric hindrance about this region of the molecules.

The (ring)C—C(ring) and (ring)C—O distances in the two zwitterionic TM chromophores TM-1 and TM-2 are only modestly shorter than in those of corresponding neutral (3, 6) and positively charged (5, 7) species (Table 1), probably a result of the very small contribution of quinoidal limit forms to the ground state, due to the twist-induced intramolecular charge transfer (see more below). Thus, there is a pronounced reduction in inter-ring π-conjugation and a dominant zwitterionic ground state in all of the TM chromophores, evidenced by the departure from quinoidal structures where typically (ring)C=C(ring) 1.349 Å and C=O≈1.222 Å.

Similar structural characteristics are revealed in the TMC chromophores. The observed (ring)C—C(ring) distances imply a strong reduction in inter-ring r-conjugation. The phenylenedicyanomethanide fragments display a markedly different bond length pattern than in typical TCNQs. The (NC)$_2$C-bound phenylene rings exhibit significantly less quinoidal character, and the (dicyanomethanide)C—C(aryl) distances lack typical TCNQ C=C(CN)$_2$ exocyclic character (~1.392 Å). This indicates predominant negative charge localization within the —C(CN)$_2$ group, also evident from the observed C—CN bond shortening (1.397(2)-1.412(2) Å in TMC-1 and 1.402(5)-1.402(6) Å in TMC-2 vs 1.427 Å in typical TCNQs), and C≡N bond elongation (1.152(2)-1.158(2) Å in TMC-1, 1.160(5)-1.165(6) Å in TMC-2 vs 1.144 Å in typical TCNQs), a result of charge resonant-stabilization via the two CN groups. Finally, there is significant pyridinium aromatic character in the TMC chromophores, with metrical papmeters paralleling N-methyl-p-phenylpyridinium salts rather than cyclopentadienylidene-1,4-dihydropyridines. Taken together, The solid state structural parameters confirm a highly charge-separated zwitterionic TMC groundstate.

TABLE 1

ORTEP drawings of the molecular structure and selected metrical parameters for twisted π-electron system chromophores and several synthetic intermediates.

| twisted molecule species | ORTEP drawing of the molecular structure[a] | (ring)C—C(ring) (Å) | (ring)C—O (Å) | (ring)C—C(CN)$_2$ (Å) | twist angle (°)[b] |
|---|---|---|---|---|---|
| 3 | | 1.5006(18) | 1.3767(16) | — | 84.2 |
| 6 | | 1.4932(18) | 1.3579(17) | — | 85.7 |

TABLE 1-continued

ORTEP drawings of the molecular structure and selected metrical parameters for twisted π-electron system chromophores and several synthetic intermediates.

| twisted molecule species | ORTEP drawing of the molecular structure[a] | (ring) C—C(ring) (Å) | (ring) C—O (Å) | (ring) C—C(CN)$_2$ (Å) | twist angle (°)[b] |
|---|---|---|---|---|---|
| 5 | | 1.496(3) | 1.372(3) | — | 87.9 |
| 7 | | 1.496(3) | 1.364(3) | — | 86.1 |
| TM-1 | | 1.489(2) | 1.312(2) | — | 86.9 |
| TM-2 | | 1.490(5) | 1.305(4) | — | 87.5 |
| TMC-1[c] | | 1.501(2) 1.492(2) | — | 1.456(2) 1.455(2) | 79.9 85.6 |

TABLE 1-continued

ORTEP drawings of the molecular structure and selected metrical parameters
for twisted π-electron system chromophores and several synthetic intermediates.

| twisted molecule species | ORTEP drawing of the molecular structure[a] | (ring) C—C(ring) (Å) | (ring) C—O (Å) | (ring) C—C(CN)$_2$ (Å) | twist angle (°)[b] |
|---|---|---|---|---|---|
| TMC-2 | | 1.488(5) | — | 1.463(5) | 89.6 |

[a]Drawn with 50% probability ellipsoids. Hydrogen atoms and solvent molecules are omitted for clarity. The iodide counterions are included in the drawings of 5 and 7.
[b]Average of four dihedral angles in the respective crystal structures.
[c]There are two independent molecules in the TMC-1 unit cell.

Figure 10:
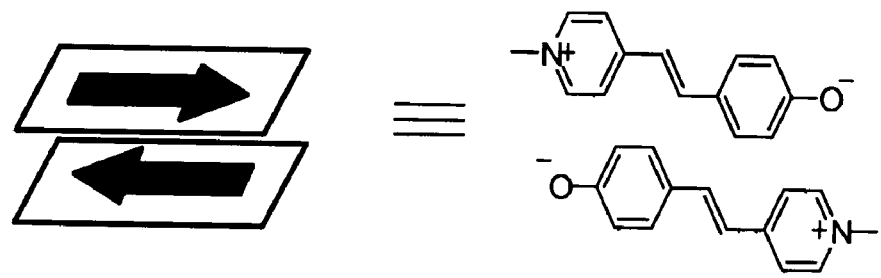
FIG. 10. Depiction of potential electrostatic dipole-dipole interaction of a merocyanine dye.

The solid state packing diagrams of chromophores TM-1, TM-2, TMC-1, and TMC-2 are shown in FIG. 1. All of the present zwitterions crystallize in antiparallel pairs as a result of electrostatic interactions involving their large dipole moments.[38] The TM-1 molecules exist in the crystal as a complex with NaI units where two molecules are linked head-to-head by Na$^+$ ions, a result of the strong phenoxide affinity for Na$^+$ (FIG. 1A). A centrosymmetric dimer of two dimeric complexes is linked between two neighboring zwitterions from each complex, arrayed in an antiparallel fashion with a distance of 6.475 Å between the aromatic backbones. This distance is considerably larger than the sums of van der Waals radii between planar cofacial π-electron systems (~3.50 Å), and is likely the result of the difficulty in closely face-to-face packing the aromatic rings in these sterically encumbered twisted π-electron molecules. The dimers are arranged along the (101) plane in a herringbone-like packing, with an angle of 30° between the backbones of adjacent dimers. TM-2 molecules arrange along the a direction in loosely interacting antiparallel pairs. These dimers have a larger separation than that in the TM-1 dimer of 8.166 Å, clearly a result of steric hindrance from the bulky t-butyl groups and N-alkyl chains. The structures of TMC-1 and TMC-2 exhibit similar but more complex packing features. A tetramer-like unit is found in the TMC-1 crystal unit cell (FIG. 1C) consisting of two independent molecules, with a distance of 6.208 Å between two neighboring molecules oriented in an antiparallel fashion, and an average distance of 6.366 Å between two skew-packed neighbors. The formation of tetramers reveals strong dipolar interactions between TMC molecules, doubtless a consequence of their large dipole moments. In the case of TMC-2, which possesses a bulky N-alkyl chain at the pyridinium fragment, the two molecules in the dimeric unit are forced apart to accommodate the bulky chain, with a larger average intermolecular distance of 8.232 Å (FIG. 10). This asymmetric dimer is related to the neighboring dimer via an inversion center to form the centrosymmetric unit cell.

All tictoid chromophores exhibit intense optical absorption in UV-vis region with the extinction coefficient as large as 38,400 M$^{-1}$ cm$^{-1}$. The optical maxima $\lambda_{max}$, extinction coefficients $\epsilon$, and the lowest energy optical gaps $E_g$ (estimated from the onset of the absorption maximum at the low energy edge) are collected in Table 2. The TM chromophore optical absorption spectra in methanol are shown in FIG. 2A. The TM-1 optical spectrum consists of two maxima at 269 ($\epsilon$=6,900 M$^{-1}$ cm$^{-1}$) and 400 nm ($\epsilon$=790 M$^{-1}$ cm$^{-1}$), corresponding to phenyl subfragment intra-ring excitations and inter-subfragment charge-transfer (CT) excitation, respectively. Pyridinium intra-subfragment excitation is expected to be at higher energy and overlap with the solvent cutoff. Such a modest extinction coefficient for the CT band indicates a pronounced reduction in inter-ring π-conjugation due to the twist. The TM-2 spectrum features an intense band at 326 nm ($\epsilon$=20,700 M$^{-1}$ cm$^{-1}$), assigned to stilbenzyl subfragment excitation, and a relatively weak CT band at 495 nm ($\epsilon$=2,010 M$^{-1}$ cm$^{-1}$) with a shoulder at short wavelength. All of the TM chromophores have limited solubilities in moderate and low polarity solvents, precluding a full comparative optical study as a function of solvents.

The TMC chromophore optical properties were studied in a range of solvents having varying polarity. Their spectra in CH$_2$Cl$_2$ are shown in FIG. 2B. It can be seen that TMC-1 and TMC-2 exhibit similar spectra with two fairly short wavelength maxima, tentatively assigned to pyridinium and phenyl subfragment high-energy intra-ring excitations, and one low-energy inter-subfragment charge-transfer (CT) excitation (FIG. 2B).[15] The CT band has a smaller oscillator strength ($\lambda_{max}$=569 nm, $\epsilon$=1,840 M$^{-1}$ cm$^{-1}$ for TMC-2 in CH$_2$Cl$_2$) than the intra-subfragment excitation band ($\lambda_{max}$=314 nm, $\epsilon$=27,200 M$^{-1}$ cm$^{-1}$ for TMC-2 in CH$_2$Cl$_2$). The principal difference between the TMC-1 and TMC-2 spectra is that the TMC-1 CT band is slightly blue-shifted vs. that of TMC-2, suggesting that any aggregation (reasonable considering the large dipole moments) is greater for methyl-functionalized TMC-1 than for bulky alkyl-functionalized TMC-2. Such CT band blue-shifts due to antiparallel centrosymmetric dimer formation have also been reported in merocyanine dye aggregation studies. FIG. 2C shows TMC-2 optical absorption spectra in solvents of different polarity. It can be seen that the TMC-2 CT bands exhibit strong negative solvatochromic effects—large blue-shifts with increasing the solvent polarity. The TMC-2 solvatochromic shift from CHCl$_3$ to MeOH is ~453 nm toward shorter wavelength, comparable to the largest solvatochromic effects observed in heavily studied betaine and merocyanine derivatives. Within the conventional interpretation of solvatochromic interactions, the negative solvatochromism indicates that the value of the dipole moment in the excited electronic state is smaller than in the ground state. Although other factors can affect the sign of solvatochromism (e.g., aggregation or different solvent polarizabilities), within the reasonable hypothesis that the various solvents here do not dramatically affect the electronic nature of the ground and excited states, the negative solvatochromism indicates that the TMC ground state is best represented by the zwitterionic limit formula. The intra-subfragment excitation bands exhibit similar, but weaker negative solvatochromism. The TMC-3 optical spectrum (FIG. 2B) features an intense band centered at ~433 nm in $CH_2Cl_2$ ($\epsilon$=38,400 L $mol^{-1}$ $cm^{-1}$) assigned to predominant stilbenzyl subfragment excitation, overlapping a relatively weak CT band centered at 540 nm ($\epsilon$=2,090 $M^{-1}$ $cm^{-1}$). Both subfragment and CT bands (a CT band of 578 nm can be deconvoluted from the subfragment excitation band in THF) exhibit negative solvatochromism (FIG. 2D).

Figure 3A:
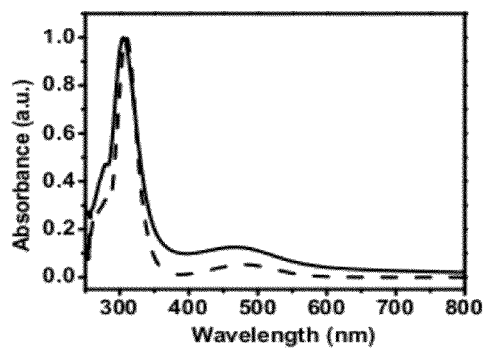
FIGS. 3A-B. Optical absorption spectra of TMC-2 (A) and TMC-3 (B) in the solid state (solid line) vs. those in DMF solution (dashed line).
Figure 3B:
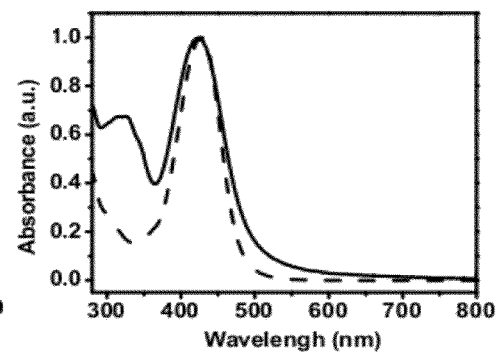

Solid state optical studies were also performed on films of TMC-2 and TMC-3 prepared by spin-coating chromophore cyclopentanone solutions onto fused quartz slides, followed by drying in a vacuum oven. The optical spectra of these films exhibit close correspondences with those acquired in DMF solution (FIG. 3). Taking into account the negative solvatochromic shift of the CT excitations and aggregation effects (vide supra), the spectral patterns exhibit no significant differences between the solid-state and solution phase.

Cyclic voltammetry (CV) was carried out under $N_2$ in a 0.1 M $Bu_4NPF_6$ solution in anhydrous MeCN, with scanning rates between 60 and 150 mV/s. Voltammograms of ~$10^{-3}$ M $CH_3CN$ solution of TM-1, TM-2, TMC-2, and TMC-3 exhibit one chemically irreversible oxidation wave and one irreversible reduction wave (two in TM-1), which can be attributed to the phenoxide/phenyldicynomethanide donor and the pyridinium acceptor moieties. Data are summarized in Tables 2a-2c. All the chromophores show comparable reduction potentials. The surprisingly high oxidation potentials of TM-2 can be attributed to weak solvation of its cation-radical, possibly due to the steric effects of the two ortho t-butyl substituents at phenoxide portion. HOMO-LUMO (electrochemical) gaps can be estimated from the oxidation and reduction potentials. A precise $E_g$ determination requires knowledge of the standard potentials. However, from the present oxidative/reductive data, HOMO-LUMO gaps of ~4.84 and 1.95 eV are estimated for TM-1 and TMC-2, respectively, in good agreement with the optical gaps (Table 2). In the case of TM-2 and TMC-3, there are considerable discrepancies between the electrochemical gaps and the optical gaps, perhaps because the HOMO-LUMO optical transitions are mixed with other transitions.

TABLE 2

Optical Absorption ($\lambda_{max}$, nm and Extinction Coefficient $\epsilon$, $M^{-1}$ $cm^{-1}$) Data, Optical Gap $E_g$ (eV), Redox Potentials E vs SCE (V), and estimated ground state Dipole Moments $\mu_g$ (D), and EFISH-derived $\mu\beta$ Values ($10^{-48}$ esu), respectively, for TM and TMC chromophores.

a

| compound | $\lambda_{max}(\epsilon)$ | | |
|---|---|---|---|
| | MeOH | $CH_3CN$ | $CH_2Cl_2$ |
| TM-1 | 269[a] (6900) | 304[a] | |
| | 400[b] (790) | 474[b] | |
| TM-2 | 326[a] (20700) | 448[a] | |
| | 495[b] (2010) | | |
| TMC-1 | 296[a] | 304[a] | 314[a] |
| | 440[b] | 462[b] | 556[b] |
| TMC-2 | 297[a] | 304[a] | 314[a] (27200) |
| | 451[b] | 472[b] | 569[b] (1840) |
| TMC-3 | 397[a] | 416[a] | 433[a] (38400) |
| | | | 540[c] (2090) | b

| compound | $E_g^d$ | $E^e$ | |
|---|---|---|---|
| | $CH_3CN$ | $E_{ox}$ | $E_{red}$ |
| TM-1 | 2.04 | 0.30 | −1.54 |
| | | | −1.65 |
| TM-2 | 2.32 | 1.25 | −1.64 |
| TMC-1 | 2.24 | | |
| TMC-2 | 2.16 | 0.39 | −1.56 |
| TMC-3 | 2.61 | 0.20 | −1.50 | c

| compound | $\mu_g^f$ | $\mu\beta$ | |
|---|---|---|---|
| | | $CH_2Cl_2$ | DMF |
| TM-1 | 20.0 | | |
| TM-2 | 37.3 | −315,000 | −49,000 |
| TMC-1 | 27.0 | | |
| TMC-2 | 27.0 | −24,000 | −5,620 |
| TMC-3 | 50.6 | −488,000 | −84,000 |

[a]Assigned to intra-subfragment excitation. Another high-energy subfragment excitation overlaps with the solvent and is not tabulated here.
[b]Assigned to low-energy inter-subfragment charge-transfer (CT) excitation.
[c]Deconvoluted from the subfragment excitation band and assigned to inter-subfragment CT.
[d]Estimated from the onset of the absorption maximum at the low energy edge.
[e]Referred to Ferrocene internal reference $E_{1/2}$ = 0.43 V vs SCE in MeCN.
[f]DFT-derived ground state dipole moment.

The IR spectra of chromophores TM-1, TM-2, TMC-2, and TMC-3 are shown in FIG. 4. Both TM-1 and TM-2 exhibit several intense infrared transitions in the 1000-1800 $cm^{-1}$ region (FIG. 4A), which mainly correspond to aromatic ring stretching modes. The features at 1585 $cm^{-1}$ in TM-1 and 1578 $cm^{-1}$ in TM-2 correspond to the aromatic stretching modes typical of phenoxide rings. The C=O stretching mode $\nu$(C=O), which is usually strongest band at 1640-1660 $cm^{-1}$ in typical benzoquinone structures, is very weak or non-existent in TM-1 (~1640 $cm^{-1}$) and TM-2 (~1636 $cm^{-1}$), arguing for only very small quinoidal limit contribution in the TM ground-state.

Figure 6A:
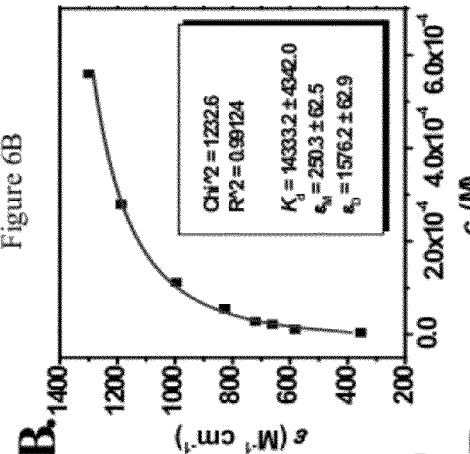
FIGS. 6A-D. (A) Concentration-dependent TMC-2 optical spectra in $CHCl_3$ solution. Arrows indicate changes in CT bands upon dilution from $5.6\times10^{-4}$ to $4.5\times10^{-6}$ M. Inset: Concentration-dependent TMC-2 optical spectra in $CH_2Cl_2$ solution ($3.0\times10^{-3}$-$2.0\times10^{-5}$ M). The monomer (dashed line) and dimer (dotted line) spectra were derived from the data at two different concentrations and $K_{dimerize}$ according to eq 8. (B) A typical nonlinear regression analysis of the TMC-2 apparent extinction coefficient ε as a function of concentration $c_0$ at 490 nm in $CHCl_3$ solution according to eq 7. The solid line is the best fit to the data. (C) Variable-concentration fluorescence spectra ($\lambda_{ex}$=350 nm) of TMC-2 in $CH_2Cl_2$, and (D) Variable-concentration fluorescence spectra ($\lambda_{ex}$=300-350 nm) of TMC-3 in $CH_2Cl_2$. Intensities are normalized for clarity.

In the TMC infrared spectra (FIGS. 4B and 4C), the CN stretching vibration, $\nu$(C≡N), is observed for both TMC-2 and TMC-3 as the most intense band at around 2164 $cm^{-1}$, with a low-energy side component (2126 $cm^{-1}$ in TMC-2 and 2118 in TMC-3). This two-peak feature is also observed in some dianionic TCNQs and zwitterionic dicynomethylene derivatives, with the more intense band assigned to an in-phase $\nu$(C≡N) normal mode and the second to the related out-of-phase motion. In contrast, compounds 12 and 14, the neutral precursors to TMC-2 and TMC-3, respectively, exhibit only a very weak transition at 2257 $cm^{-1}$. The $\nu$(C≡N) energy is known to be highly sensitive to the electron density localized on the C≡N fragment, e.g., converting phenylmalononitrile into the carbanion is accompanied by a strong decrease of the CN stretching frequency (for phenylmalononitrile $\nu$(C≡N)=2254 $cm^{-1}$ versus $\nu$(C≡N)=2163, 2117 cm$^{-1}$ in the carbanion), dramatic increases in the corresponding integrated intensities (~136-fold), and strong enhancement of the v(C≡N) vibrational coupling (v(C≡N) splitting=46 cm$^{-1}$). Thus, the electron density localized on the dicyanomethanide fragments of TMC-2 and TMC-3 is qualitatively similar to that of phenylmalononitrile carbanion, where the dicyanomethanide unit supports nearly one negative charge. Furthermore, note that both the TMC-2 and TMC-3 IR spectra recorded in solid state (KBr pellet) and in solution (CH$_2$Cl$_2$) are virtually identical, indicating very similar electron density distributions, hence molecular structural characteristics, both in the solid state and in solution. One interesting observation is that neutral precursors 12 and 14 exhibit similar spectral features in the solid state (KBr pellet) which are very similar to those of the zwitterions (FIGS. 4B and 4C), implying a possible proton transfer between the strong acidic dicyanomethylene group and pyridine group.

polar CHCl$_3$ ($\epsilon_r$=4.81) solutions can be observed upon variation of the concentration over the range 4.5×10$^{-6}$-5.5×10$^{-4}$ M (FIG. 6A). The spectra at highest dilution can be ascribed to the monomeric chromophore with a CT band centered around 621 nm. Upon increasing the concentration, the spectra exhibit diminution of this CT band and concomitant appearance/growth of a new transition at shorter wavelength, revealing the onset of aggregation. A well-defined isosbestic point clearly indicates equilibrium between monomer (M) and dimer (D). Pragmatically employing the simplest dimerization model for the moment (2M ⇌ D) the dimerization constant $K_d$ can be defined as:

$$K_d = \frac{c_D}{c_M^2} = \frac{1-\alpha}{2\alpha^2 c_0} \tag{6}$$

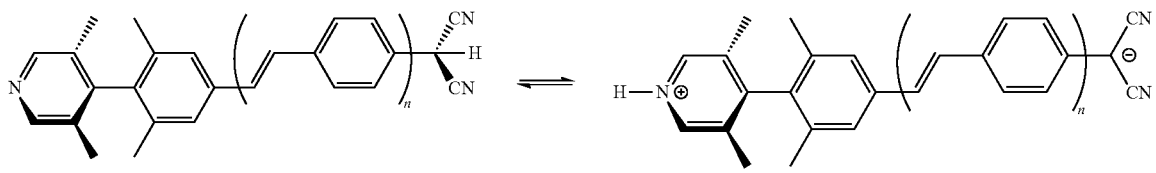

Solid-state CPMAS $^{13}$C NMR and solution phase $^{13}$C NMR spectra of chromophores TMC-2 and TMC-3 are compared in FIG. 5. Spinning sidebands (~3.5K) and NMR rotor background in solid-state NMR have been taken into account. The comparison of solid-state NMR spectra with those in solution provides additional insights into chromophore molecular structure and electronic charge distribution in the solid state vs. solution, since any significant change in twist angle should drastically shift the distribution between zwitterionic and quinoidal electronic structures, hence the chemical shifts of the nuclei proximate to the π-electron core. A change of one electron in π-electron density for a π-conjugated system is expected to result in a total change of ~160 ppm in carbon atom chemical shift. As can be seen in the NMR spectra, the TMC-2 resonances (FIG. 5A) are virtually identical in the solid state (which can be taken to be a rather polar environment) and in less polar CD$_2$Cl$_2$ ($\epsilon_r^{25}$=8.93). The non-overlapped signals adjacent to positively charged pyridinium center in the solid state NMR spectra, δ(N—CH$_2$, 67.1 ppm) and δ(pyr, 163.9 ppm), are displaced only 0.8 and 0.9 ppm upfield, respectively, in CD$_2$Cl$_2$. In the case of highly polar DMSO-d$_6$ ($\epsilon_r^{25}$=46.45), these signals are shifted slightly more upfield (3-4 ppm). Since the change in distribution between zwitterionic and quinoidal structural contributions on going from less polar to highly polar solvents should result in a downfield displacement of these signals, the observed upfield displacement on dissolution in DMSO-d$_6$ must therefore reflect other solvation or aggregation (see below) rather that a major change in twist angle. The TMC-3 $^{13}$C NMR spectra in the solid state and in DMSO-d$_6$ are nearly identical (FIG. 5B), with only a minor change of 0.3 ppm in δ(N—CH$_2$). These results exclude any significant changes in molecular twist angles on going from the condensed state to the solution phase, consistent with the observations in the optical and IR spectra discussed above.

The aggregation state of chromophore TMC-2 in solution was studied by variable-concentration optical spectroscopic methods. Significant TMC-2 spectral changes in moderately where $c_D$ and $c_M$ are the equilibrium concentrations of dimer and monomer, respectively, $c_0$ is the initial concentration, and α is the fraction of the monomer in solution, defined as α=$c_M$/$c_0$. The apparent extinction coefficient ε can then be expressed as:

$$\epsilon = \epsilon_M \alpha + \epsilon_D (1-\alpha) \tag{7}$$

where $\epsilon_M$ and $\epsilon_D$ are extinction coefficients of monomer and dimer, respectively. Combining eqs 6 and 7, yields an expression for the apparent extinction coefficient ε as:

$$\varepsilon = \frac{\sqrt{8K_d c_0 + 1} - 1}{4K_d c_0}(\varepsilon_M - \varepsilon_D) + \varepsilon_D \tag{8}$$

Nonlinear regression analysis (FIG. 6B) of ε as a function of solution concentration at a specific wavelength based on eq 8 yields $K_d$=13300±1420 M$^{-1}$ (average of the nonlinear regression analysis data at 6 different wavelengths), and the related Gibbs dimerization free energy ΔG°$_d$=−23.5±0.3 kJ mol$^{-1}$ can be derived from eq 9

$$\Delta G^°_d = -RT \ln K_d \tag{9}$$

The respective monomer and dimer spectra can be then calculated from the derived $K_d$ and the absorption data at two different concentrations according to eq 8 (FIG. 6A). Concentration-dependent TMC-2 optical studies in more polar CH$_2$Cl$_2$ (FIG. 6A, inset) indicate similar aggregation effects but at higher concentration ranges (10$^{-4}$-10$^{-3}$ M). Nonlinear regression analysis yields smaller $K_d$ and ΔG°$_d$ values of 246±30 M$^{-1}$ and −13.6±0.3 kJ mol$^{-1}$, respectively.

The TMC-2 aggregation in CH$_2$Cl$_2$ is also evidenced form variable-concentration fluorescence spectra. Significant TMC-2 spectral changes can be observed upon variation of the concentration over the range 1×10$^{-3}$-1×10$^{-5}$ M (FIG. 6C) with a clear transition from λ$_{em}$=462 nm for a dimer to λ$_{em}$=522 nm for a monomer, in agreement with the optical absorption spectral data. TMC-3 aggregation is more difficult to observe in optical spectra due to overlapped CT transitions (FIG. 2B). Alternatively, variable-concentration TMC-3 fluorescence spectra in $CH_2Cl_2$ (FIG. 6D) reveal a clear transition from dimer (515 nm) to monomer (485 nm) emission upon dilution in the range of $5 \times 10^{-4}$-$2.5 \times 10^{-6}$ M. Although quantitative aggregation information is difficult to estimate in fluorescence spectra due to the quenching of fluorescence in aggregates, these results provide further evidence of TMC aggregation.

PGSE (pulsed field gradient spin-echo) NMR techniques represent an incisive tool to quantify molecular dimensions in solution and, consequently, levels of aggregation. Experimentally determined translational self-diffusion coefficients ($D_t$), hydrodynamic radii ($r_H$), volumes ($V_H$), and the ratio between $V_H$ and the van der Waals volume ($V_{vdW}$) afford aggregation numbers $N(N=V_H/V_{vdW})$ readily indicating aggregation levels in solution (N=1.0, 1.5, or 2.0 indicates 100% monomer, 50% monomer+50% dimer, or 100% of dimer, respectively). Table 3 summarizes the results of the PGSE measurements carried out on chromophores TMC-2 and TMC-3 in both $CD_2Cl_2$ and DMSO-$d_6$ over a broad range of concentrations. The variation in the aggregation number N as a function of the concentration is shown in FIG. 7. The trends in N vs. concentration (Table 3, FIG. 7) clearly show that monomer predominates in very polar DMSO-$d_6$ ($\epsilon_r^{25}$=46.45) for both TMC-2 and TMC-3 over the entire concentration range (Table 3, entries 7-9 and 15-17). In $CD_2Cl_2$ ($\epsilon_r^{25}$=8.93), TMC-2 is exclusively monomeric only at the lowest concentrations examined ($4 \times 10^{-6}$ M, Table 2, entry 1) while dimers (Table 3, entries 4-5) and even larger aggregates (N=2.7, Table 3, entry 6) are present at the highest concentrations (FIG. 3). TMC-2 exhibits a greater tendency for aggregation and is not exclusively monomeric even at $5 \times 10^{-6}$ M (Table 3, entry 10). For TMC-3, aggregates larger than dimers are determined to be present at the highest concentrations (N=2.4, Table 3, entry 14).

TABLE 3

Diffusion Coefficient ($D_t$, $10^{-10}$ m$^2$ s$^{-1}$), Hydrodynamic Radius ($r_H$, Å), Hydrodynamic Volume ($V_H$, Å$^3$), and Aggregation Number (N = $V_H/V_{vdW}{}^a$) for TMC-2 and TMC-3 as a function of concentration c.

| entry | Compound and Solvent | c(mM) | $D_t$ | $r_H$ | $V_H$ | N |
|---|---|---|---|---|---|---|
| | TMC-2 | | | | | |
| 1 | $CD_2Cl_2$ | 0.004 | 10.0(6) | 4.60 | 408 | 1.0(4) |
| 2 | $CD_2Cl_2$ | 0.07 | 9.3(2) | 4.96 | 512 | 1.3(1) |
| 3 | $CD_2Cl_2$ | 0.5 | 9.0(5) | 5.11 | 558 | 1.4(3) |
| 4 | $CD_2Cl_2$ | 1.6 | 8.5(2) | 5.43 | 670 | 1.7(1) |
| 5 | $CD_2Cl_2$ | 4.0 | 7.7(7) | 5.95 | 881 | 2.2(5) |
| 6 | $CD_2Cl_2$ | 8.4[b] | 7.3(0) | 6.33 | 1064 | 2.7(3) |
| 7 | DMSO-$d_6$ | 0.05 | 1.9(9) | 4.64 | 417 | 1.1(3) |
| 8 | DMSO-$d_6$ | 0.34 | 1.9(4) | 4.74 | 448 | 1.1(4) |
| 9 | DMSO-$d_6$ | 4.83 | 1.9(5) | 4.72 | 440 | 1.0(7) |
| | TMC-3 | | | | | |
| 10 | $CD_2Cl_2$ | 0.005 | 7.9(7) | 5.32 | 630 | 1.2(9) |
| 11 | $CD_2Cl_2$ | 0.01 | 7.8(7) | 5.39 | 654 | 1.3(5) |
| 12 | $CD_2Cl_2$ | 0.083 | 7.4(6) | 5.68 | 769 | 1.5(8) |
| 13 | $CD_2Cl_2$ | 0.25 | 7.0(7) | 5.99 | 903 | 1.8(6) |
| 14 | $CD_2Cl_2$ | 0.49[b] | 6.4(2) | 6.60 | 1205 | 2.4(8) |
| 15 | DMSO-$d_6$ | 0.08 | 1.6(8) | 5.02 | 529 | 1.1(2) |
| 16 | DMSO-$d_6$ | 1.34 | 1.6(9) | 4.99 | 522 | 1.0(7) |
| 17 | DMSO-$d_6$ | 3.4 | 1.6(6) | 5.07 | 547 | 1.0(9) |

[a]Van der Waal volumes: TMC-1, 389 Å$^3$ (from X-Ray data, unpublished results); TMC-2, 486 Å$^3$, computed from X-Ray data of TMC-1 adding the volume of a styryl moiety (97 Å$^3$)].
[b]Saturated solution.

Regarding, EFISH-derived µβ values for chromophore TM-2, TCM-2 and TCM-3, in $CH_2Cl_2$ and DMF, the variation of the µβ values for TCM-2 and TCM-3 as a function of the concentration is shown in FIG. 7, in comparison with PGSE-derived aggregation numbers. In less polar $CH_2Cl_2$, the µβ values exhibit a pronounced concentration-dependence. The TCM-2 µβ rapidly increases as the concentration falls in the range of $10^{-3}$-$10^{-5}$M, with µβ saturating at a large value of $-24,000 \pm 4320 \times 10^{-48}$ esu at $5 \times 10^{-6}$ M (FIG. 7A). Significant deaggregation of TCM-3 in $CH_2Cl_2$ occurs at lower concentrations, in the range $10^{-5}$-$10^{-6}$M (FIG. 7B), with an unprecedented µβ value of $-488,000 \pm 48800 \times 10^{-48}$ esu measured at $8 \times 10^{-7}$ M. The TM-2 µβ exhibits similar concentration-dependence in $CH_2Cl_2$, with µβ value of $-315,000 \pm 56700 \times 10^{-48}$ esu measured at $1 \times 10^{-6}$M (Table S3). From the computed µ values, $\beta_{0.65\ eV}$~8450, 890 and $9800 \times 10^{-30}$ esu are estimated for TM-2, TCM-2 and TCM-3, respectively.

TMC µβ values measured in highly polar DMF are considerably less sensitive to concentration. The µβ of TMC-2 (FIG. 7A) begins to saturate at ~$5 \times 10^{-5}$ M, with µβ=$-5,620 \pm 618 \times 10^{-48}$ esu at $5 \times 10^{-6}$M, while the µβ values of TMC-3 (FIG. 7B) still exhibit a gentle increase up to the highest dilution, with µβ=$-84,000 \pm 10080 \times 10^{-48}$ esu measured at $1.1 \times 10^{-6}$ M. Similarly, the TM-2 µβ in DMF exhibits saturation in dilution, with µβ=$-49,000 \pm 9800 \times 10^{-48}$ esu measured at $1 \times 10^{-5}$ M.

Figure 8:
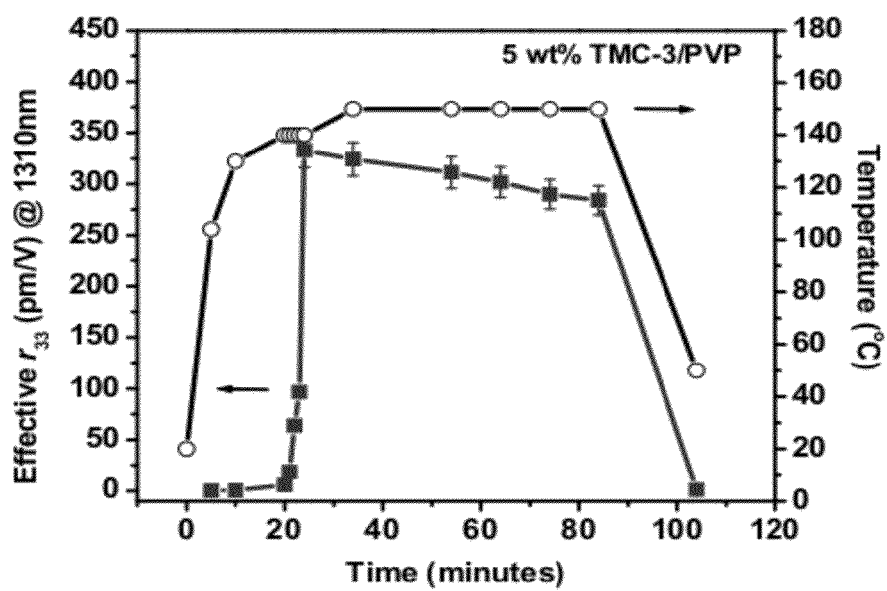
FIG. 8. In situ poling and Teng-Man direct EO measurements on a polyvinylphenol (PVP) film containing 5 wt % TMC-3, poled at 100 V/μm.

Poly(vinylphenol) films containing 10 wt % TMC-2 and 5 wt % TMC-3, poled at 100 V/µm, give nonresonant $r_{33}$ values of 48 and 330 pm/V, respectively, as determined by Teng-Man electro-optic measurements at 1310 nm. FIG. 8 shows a typical profile for in-situ poling and Teng-Man measurement on 5 wt % TMC-3/PVP guest-host films. Under the applied DC electric poling field, the effective $r_{33}$ undergoes a rapid increase when the temperature rises to ~140° C. (the DSC-derived $T_g$ of 5 wt % TMC-3/PVP is ~148° C.), and reaches a saturation value of 330 pm/V when temperature is held at 140° C. Further temperature increases result in a slow decrease of $r_{33}$ and when heating is removed, the $r_{33}$ quickly drops to the noise level. This poling behavior presumably reflects the strong aggregation tendency of these zwitterions, which is also observed in less polar matrices, e.g., amorphous polycarbonate (APC, $\epsilon_r$=3 vs $\epsilon_r$=4.5 for PVP), where only very low EO responses are observed.

The formation of highly encumbered substitution patterns via the coupling of two arenes possessing bulky ortho substituents, specifically, the synthesis of the tetra-ortho-methylbiaryl cores of the TM and TMC chromophore skeletons, presents a non-trivial synthetic challenge. The Suzuki methodology was chosen since it has previously demonstrated excellent tolerance to steric constraints among the catalytic cross-coupling reactions for unsymmetrical biaryl synthesis. Employing a highly active Pd(0)/DCPPP Suzuki catalyst, 4-bromopyridine N-oxide 1 can be coupled with boronic acid 2 to afford the key tetra-ortho-methylphenylpyridine core 3 in 53% yield (Scheme 1). A pyridine N-oxide precursor is used since the corresponding pyridine species evidences a pronounced sluggishness in the present coupling process, for the reasons possibly involving coordinative inhibition at the Pd center. Interestingly, the N-oxide functionality does not appear to induce detrimental oxidation of the Pd(0) form of the catalyst here.

Another synthetic challenge involved in the TMC syntheses is the synthesis of twisted biaryl iodide 11, not only for facilitating the Heck coupling process in the TM-2 synthesis, but also for enabling dicyanomethanide group introduction into the TMC skeletons—a transformation which cannot be efficiently achieved via nucleophilic triflate substitution at 8.

Converting phenol 6 into aryl halides, which can subsequently undergo cross-coupling with active methylene regents such as malononitrile in the presence of Pd catalysts, is a consideration of the TMC synthetic strategy. The only examples in the literature for the effective direct conversion of phenols to aryl halides, such as the thermolysis of the phenol-triphenylphosphine dibromide adduct, and displacement of triflate by iodide or bromide, are unsuccessful in the present case. An effective new strategy was devised for converting phenol 6 to iodide 11 by combining Pd-catalyzed aryl triflate amination with arylamine-to-aryl halide conversion (Scheme 1). The overall yield of this four-step phenol-to-aryl iodide conversion is 65% and therefore represents an efficient general route for phenol-to-aryl halide conversion.

Figure 9:
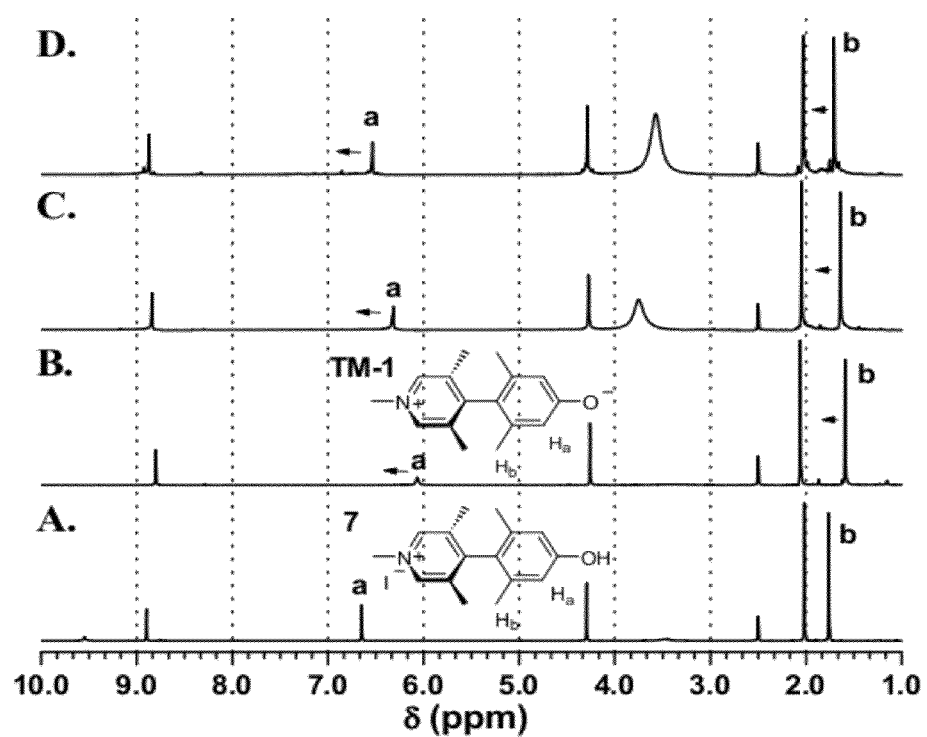
FIG. 9. $^1H$ NMR spectra (400 MHz, 25° C.) of precursor 7 (A), TM-1 (B) in dry DMSO-$d_6$, and TM-1 in DMSO-$d_6$ solution exposed in the air during the period of 1 day (C) and 5 days (D).

The product TM and TMC chromophores exhibit very different chemical and thermal stability characteristics. TM chromophores exhibit considerable sensitivity to the moisture. Dark red TM-1 solid quickly bleaches when exposed to moisture, implying that protonation may take place at the aryl O⁻ group, evidenced by $^1$H NMR spectroscopy in DMSO-$d_6$ (FIG. 9). The signals from phenylene ring and methyl protons adjacent to the aryl O⁻ group ($H^a$ and $H^b$, FIG. 9) are displaced significantly downfield when the NMR solution is exposed to moisture. This marked proton affinity is consistent with a twist-induced reduction in inter-ring r-conjugation, thereby resulting in a dominant charge-separated zwitterionic groundstate, describable as a non-communicating phenoxide anion adjacent to a pyridinium cation. Here the phenoxide portion is expected to be a strong Lewis base (the pKa of the related 3,5-dimethylphenol is 10.2). Such a charge-localized structure may also account for the low thermal stability observed in TM-1, where the pyridinium N-methyl substituent undergoes alkylative migration to the aryl O⁻ group to form neutral 4-(4-methoxy-2,6-dimethyl-phenyl)-3,5-dimethyl-pyridine (4, Scheme 1) when heated to 200° C. in vacuum, reflecting the strong nucleophilicity of the aryl O⁻ group. TM-2 exhibits slightly enhanced stability compared with TM-1, probably due to the steric protection of the two bulky ortho t-butyl substituents adjacent to the aryl O⁻ group. In addition to moisture sensitivity, both TM chromophores have low solubilities in most organic solvents, even in the case of N-octyl-functionalized TM-2.

In marked contrast to the TM chromophores, the TMC chromophores are air- and moisture-stable and readily purifiable by conventional column chromatography. Thermogravimetric analysis indicates that these materials have very high thermal stability ($T_d$≈1306° C. for TMC-2, ≈330° C. for TMC-3), while $^1$H NMR spectroscopy indicates stability in DMSO-$d_6$ solution at 150° C. for periods of hours under air. This marked chemical and thermal robustness doubtless results from introduction of the charge-stabilizing dicyanomethanide functionality, where negative charge is delocalized by two strong electron-withdrawing cyano groups through resonant delocalization (also observable in the crystallographic data, vide supra). Here the dicyanomethanide portion is expected to be a weak Lewis base (the pKa of related phenylmalononitrile is 4.2). For donor-acceptor EQ chromophores, the TMC series is a noteworthy example of introducing a stabilized anion into a twisted π-electron system zwitterion, where significant charge stabilization through a quinoidal limiting resonance structure is unlikely.

The combination of single-crystal XRD data with optical, IR, and NMR spectroscopies, both in the solid state and in solution, provides fundamental architectural and electronic structural insight into these new tictoid chromophores. The most important feature revealed from the crystallographic analyses of the target chromophores as well as their synthetic precursors is the consistently large and relatively uniform arene-arene dihedral twist angle (80°-89°) (Table 1), suggesting that the tetra-ortho-methylbiaryl substitution pattern indeed provides sufficient steric encumbrance to achieve the desired interring staggering, an anticipated prerequisite for large molecular hyperpolarizabilities in such twisted π-electron system chromophores. Furthermore, it can be seen that the magnitude of this twist is governed primarily by sterics and is essentially independent of chromophore architecture and charge distribution. Indeed, neutral, positively charged, and zwitterionic molecules all exhibit comparable twist angles (Table 1). A number of earlier studies have shown that the electronic structure of merocyanines can be described as a combination of the quinoid and benzenoid limiting structures and that any external pertubation, such as solvation or an external electric field, can lead to stabilization of the charge-separated benzenoid structure. The electronic structures of these chromophores are therefore highly dependent on the state of the materials and medium surrounding the molecules.

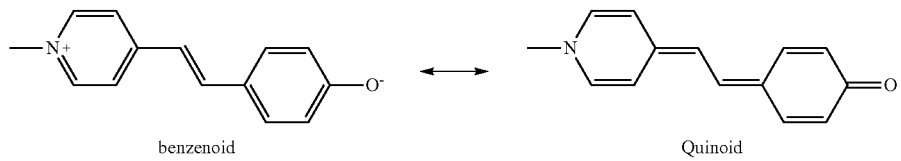

benzenoid        Quinoid

In the present tictoid chromophores, the steric encumberance-induced twist leads to a pronounced enforced reduction in inter-ring π-conjugation, and this in turn leads to aromatic stabilization of the resultant pyridinium and phenoxide/phenyldicynomethanide fragments, resulting in a chemically, thermally robust, dominant charge-separated zwitterionic ground state. Molecular electronic structure should be predominantly governed by the twist, and less dependent on external perturbations. This solid state zwitterionic structural assignment is supported by a full complement of single-crystal metrical parameters, such as the (ring)C—C(ring), (ring)C—O, and (dicyanomethanide)C—C(aryl) distances, and the bond length patterns within the pyridinium and phenoxide/phenyldicynomethanide fragments.

Optical spectroscopies provide further evidence for a zwitterionic tictoid groundstate in the solution phase. The tictoid spectra exhibit both inter-ring HOMO-LUMO charge transfer (CT) excitations as well as intra-subfragment transitions within the pyridinium and phenyl (stilbenzyl in TM-2 and TMC-3) fragments. This implies that the tictoid groundstate is better described in terms of linked pyridinium acceptor and phenoxide/phenyldicynomethanide donor portions. The relative small oscillator strengths in the CT band appear to reflect the pronounced reduction in inter-ring π-conjugation, and are consistent with large inter-ring dihedral angles observed in the X-ray diffraction studies. Furthermore, the strong negative solvatochromism effects observed in the TMC optical spectra indicate that the groundstate dipole moment is substantially larger than in the excited state, consistent with a dominant zwitterionic groundstate description.

The twist chromophore IR vibrational spectroscopic features provide structural information consistent with that obtained from the XRD analysis and optical spectroscopic studies. The typical benzenoid phenoxide ring stretching features and the strong reduction of quinoid C=O vibration in the TM chromophores, and the almost pure phenyldicynomethnide anion-like C≡N stretching vibration in the TMC chromophores clearly support a dominant zwitterionic structure in ground state. Comparative solid-state $^{13}$C NMR, optical, and IR spectroscopic studies provide additional structure-property information regarding solution phase vs. solid phase TM and TMC properties. Close correspondence between solid-state $^{13}$C NMR, optical, and IR spectra and those recorded in solution argue that the large inter-ring dihedral twist angle and zwitterionic groundstate observed in the solid state persist in the solution phase essentially unchanged, and that it is reasonable to interpret TMC solution phase properties (such as linear/nonlinear optical response) in terms of solid-state crystal structure metrical parameters (in particular the twist angle).

The aggregation of dipolar NLO chromophores has been identified as an important issue in understanding basic molecular EO properties as well as in applications. In the case of merocyanine dyes, the centrosymmetric dye aggregation can relate to possible electrostatic dipole-dipole interactions of the sort illustrated in FIG. 10. This type of aggregation is obviously detrimental to applications in electric-optics where a microstructurally polar chromophore arrangement is useful. In removing the impediment of aggregation, the exceptional molecular hyperpolarizability properties in tictoid chromophores can be accessed and fully utilized. As might be expected from the foregoing, the new tictoid chromophores described here exhibit significant aggregation tendencies in the solid state and in concentrated solutions, evidenced from X-ray diffraction data and concentration-dependent optical absorption, fluorescence, and PGSE NMR spectroscopic studies—results entirely reasonable considering the large computed dipole moments.

Analysis of the tictoid zwitterion packing in the crystalline state clearly shows the formation of centrosymmetric antiparallel dimers. Although the substituent-modulated intermolecular distances between tictoid molecules in the dimeric units are larger than those observed in planar merocyanine zwitterion dimmers (~3.50 Å), the very strong dipole moments in the highly charge-separated tictoid molecules still result in comparable or even larger electrostatic interactions (this can be readily seen from estimated binding energies compared with those of planar zwitterions, vide infra). These intermolecular distances depend principally on steric details. It can be seen in FIG. 1 that the TMC-2 dimeric units have larger intermolecular distances separating monomers than in TMC-1 dimeric units, clearly the result of accommodating the bulky N-alkyl chain. The relatively looser packing in TMC-2 vs. TMC-1 can also be seen in the crystal densities (1.110 g/cm$^3$ for TMC-2 vs 1.184 g/cm$^3$ for TMC-1), which is also consistent with the reduced dimerization energy of TMC-2 in solution compared with TMC-1 (vide supra).

The strong aggregation tendency of TMC-2 is further supported by concentration-dependent optical absorption spectra, exhibiting a pronounced blue-shift and decrease of the CT excitation intensity upon increasing the concentration. Moreover, an isosbestic point is observed, supporting well-defined aggregation equilibria and indicating the formation of a H-type antiparallel centrosymmetric aggregates, in agreement with the X-ray diffraction data. The binding energetics, estimated by analyzing the TMC-2 extinction coefficient as a function of concentration assuming a simplistic (but tractable) dimerization model, not unexpectedly indicate that the aggregation is weaker in more polar solvents, with derived binding constant $K_d$=250±30 M$^{-1}$ and Gibbs free energy $\Delta G°_d$=–13.6±0.3 kJ mol$^{-1}$ in CH$_2$Cl$_2$ ($\epsilon_r^{25}$=8.93) vs. $K_d$=13300±1420 M$^{-1}$ and $\Delta G°_d$=–23.5±0.3 kJ mol$^{-1}$ in less polar CHCl$_3$ ($\epsilon_r^{25}$=4.81). The aggregation free energy is expected to be highly dependent on solvent polarity when the electrostatic interactions between two interacting monomer dipole moments dominate the binding forces. These $K_d$ and $\Delta G°_d$ values indicate stronger aggregation in TMC-2 than in typical planar merocyanine zwitterions in the same solvents (e.g., the dye HPOP has a binding constant $K_d$ of 520 M$^{-1}$ and Gibbs free energy $\Delta G°_d$ of –15.2 kJ mol$^{-1}$ in CHCl$_3$), doubtless caused by the larger TMC molecular dipole moments, clearly a consequence of the highly charge-separated groundstates. Variable-concentration TMC-3 fluorescence spectra in CH$_2$Cl$_2$ provide further evidence of TMC aggregation. It can be seen that significantly higher concentrations are necessary to observe aggregation effects in TMC-2 than for TMC-3 in same solvent, clearly a result of a much greater dipole moment in TMC-3 than in TMC-2

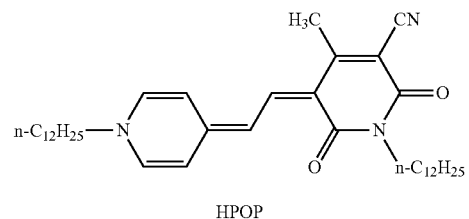

HPOP

Figure 1C:
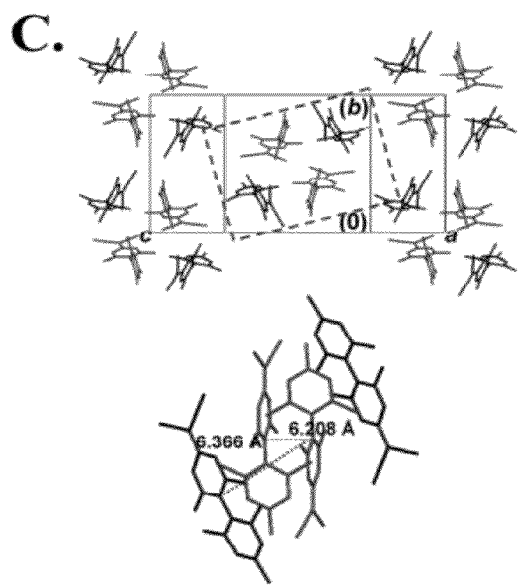
Figure 1D:
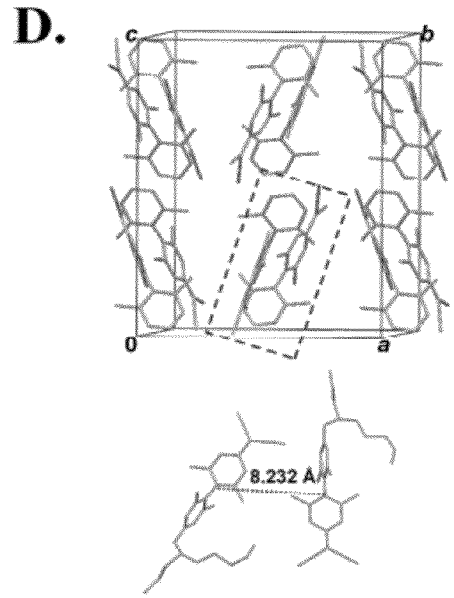
Figure 6B:
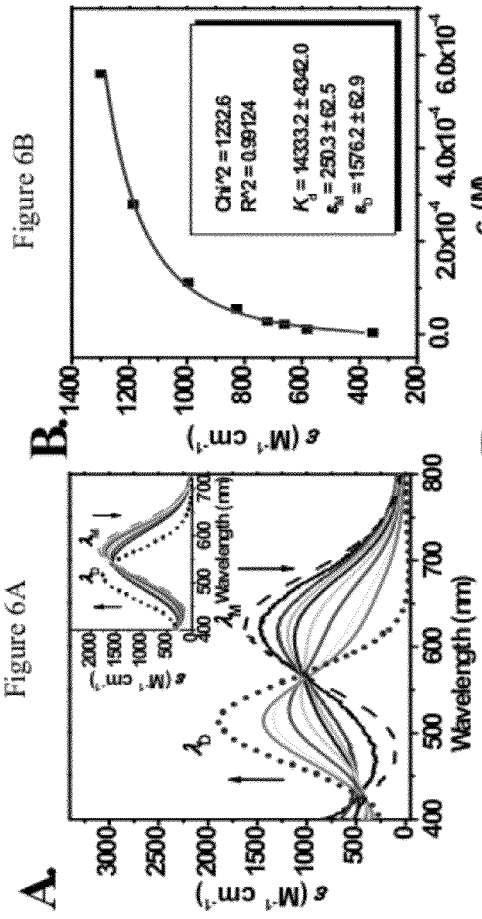
Figure 6C:
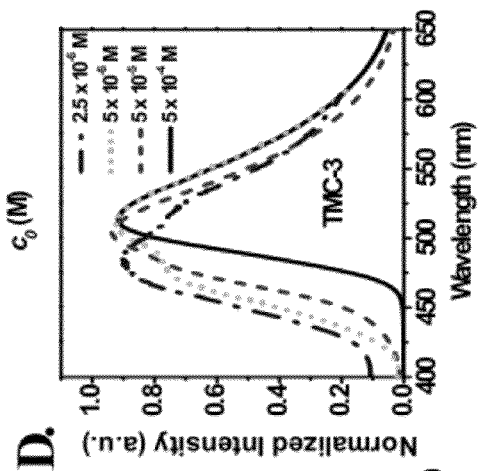
Figure 6D:
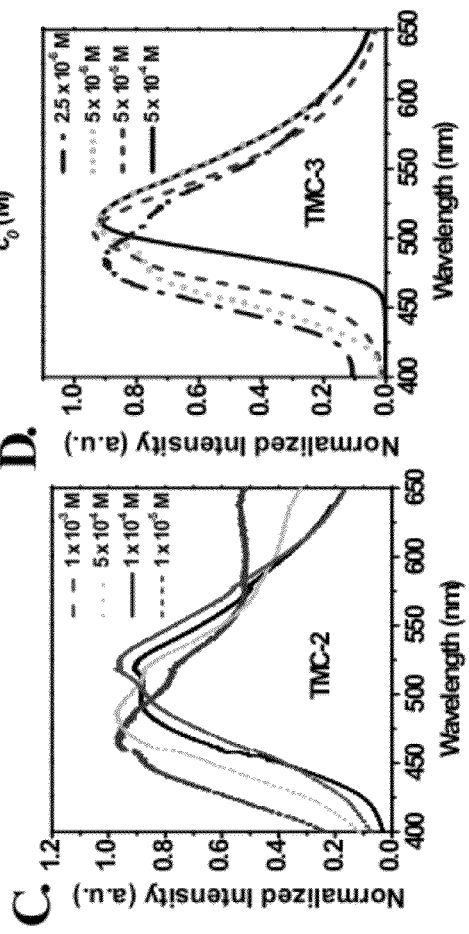

PGSE NMR spectroscopy provides additional, quantitative information on the state of TMC aggregation. Both TMC-2 and TMC-3 exhibit pronounced aggregation tendencies in CD$_2$Cl$_2$ ($\epsilon_r^{25}$=8.93), with TMC-3 exhibiting substantially greater aggregation levels than TMC-2. At the highest accessible concentrations, TMC-2 and TMC-3 exhibit aggregation numbers of N=2.7 and 2.5, respectively, implying that more complex aggregates than dimers are also present, consistent with the tetramer-like aggregates observed in TMC crystal structure data (FIG. 1C). The aggregation numbers decrease upon dilution, tending toward N=1.0 and revealing dissociation of aggregates in dilute solutions in the 10$^{-3}$-10$^{-4}$ M concentration range for TMC-2, in good agreement with the optical spectroscopic data (FIG. 6A, inset). TMC-3 exhibits a greater aggregation tendencies and is not exclusively monomeric even at 5×10$^{-6}$ M, consistent with the results of the variable-concentration TMC-3 fluorescence spectroscopy (FIG. 6B). The aggregation numbers for both TMC-2 and TMC-3 in more polar DMSO-d$_6$ ($\epsilon_r^{25}$=46.45) are close to 1.0 and almost independent of the concentration, clearly the result of the aforementioned strong polar solvation effects on aggregation.

EFISH-derived µβ values for chromophores TCM-2 and TCM-3 in CH$_2$Cl$_2$ and DMF exhibit negative signs, indicating that the groundstate is more polar than the excited state, in agreement with the observed negative solvatochromism (vide supra). In less polar CH$_2$Cl$_2$ (FIG. 7), the µβ values exhibit a pronounced concentration dependence due to the aforementioned aggregation effects, of a type previously reported for zwitterionic TCNQ derivatives. The comparison between EFISH and PGSE data over a wide range of concentrations shows good agreement with the trends in aggregation (FIG.

7). The TCM-2 μβ in CH$_2$Cl$_2$ rapidly increases as concentration falls, implying the dissociation of (presumably centrosymmetric) aggregates. Indeed, the μβ approaches a maximum at concentrations where the PGSE measurements indicate the presence of greater than 80% monomer (FIG. 7A). Again, TCM-3 deaggregation trends in the EFISH data (FIG. 7B) closely parallel those for the PGSE data, with μβ rapidly increasing at a concentration levels where the monomer content is ~80% (FIG. 7B) and saturating at an unprecedented μβ value of −488,000±48800×10$^{-48}$ esu at 1907 nm. The chromophore figure of merit, defined by μβ/M$_w$, is as large as 945×10$^{-48}$ esu, almost 20 times larger than the highest value of 46×10$^{-48}$ esu previously reported. The off-resonance β$_{0.65\ eV}$ estimated from the computed μ values is as large as 9800×10$^{-30}$ esu.

In recent elegant work, the fundamental limits of hyperpolarizability were estimated using quantum sum rules and found that the apparent limit for all the experimentally achieved hyperpolarizabilities in organic molecules falls far short of the fundamental limit by a factor of 10$^{-3/2}$. (a) See, Tripathy, K.; Moreno, J. P.; Kuzyk, M. G.; Coe, B. J.; Clays, K.; Kelley, A. M. *J. Chem. Phys.* 2004, 121, 7932. (b) Kuzyk, M. G. *Phys. Rev. Lett.* 2000, 85(6), 1218. For example, a chromophore having 22 π-electrons and an absorption maximum of 540 nm, as in tictoid chromophore TMC-3, could possess a maximum non-resonant β as large as 20,000×10$^{-30}$ esu according to Kuzyk's estimates. However, all βs achieved previously fall below an apparent limit of ~600×10$^{-30}$ esu. For the first time, the βs achieved in the present tictoid chromophores approach the fundamental limit, clearly suggesting a new paradigm for organic electro-optics. These results may provide insights into the reasons for this universal gap between the experimental β results and the fundamental limits.

The μβ values measured in highly polar DMF ($\epsilon_r^{25}$=37.8) exhibit a less abrupt increase as concentration falls, a sign of a weaker aggregation in more polar DMF than in CH$_2$Cl$_2$ ($\epsilon_r^{25}$=8.93), consistent with the PGSE data. That the magnitude of the EFISH-derived μβ is lower in more polar solvents has also been reported for other zwitterionic chromophores and theoretically investigated. It was found that the first hyperpolarizabilities of zwitterionic molecules exhibit remarkable solvation effects. The β values are small and positive in the gas phase and change to negative with increasing solvent polarity. They remain negative in all the polar solvents and reach a maximum at a moderate $\epsilon_r$~6-8, and then again decrease slowly with further increase of $\epsilon_r$. This behavior is ascribed principally to the change of the charge distribution and the dipole moment. Once the structure is dominated by the zwitterionic limit, β values decrease with increasing solvent polarity.

In the present EFISH measurements, external electric field effects on reducing the chromophore aggregation must also be taken into account, as shown in previous studies. This effect may be expected to be significant if the species in aggregation equilibrium strongly differ in dipole moments, as the monomeric and dimeric species in the present zwitterionic chromophores. The competition between internal dipolar interactions leading to aggregation and the external electric fields leading to dissociation could conceivably shift the aggregation equilibrium to some degree. Taking a simple dimerization model, the new dimerization constant under an applied electric field, $K_d^E$ is given by eq 10[37]

$$K_d^E = K_d \exp(-\Delta G_d^E/RT) \quad (10)$$

where $\Delta G_d^E$ is the electric field-induced contribution to the Gibbs free energy of the dimerization, which can be estimated, assuming a vanishing dimer dipole moment, by eq 11

$$\Delta G_d^E = \frac{N_A L^2 \mu_g^2 E^2}{3kT} \quad (11)$$

where $N_A$ is Avogadro's number, L a Lorentz local field factor given by L=($\epsilon_r$+2)/3, $\mu_g$ the dipole moment of chromophore, and E electric field. For chromophore TMC-2 in CH$_2$Cl$_2$ with a DFT-derived groundstate dipole moment of 27.0 D and an estimated dimerization constant $K_d$=246 M$^{-1}$ and applying an EFISH field of 7×10$^6$ V/m, the field-dependent dimerization constant $K_d^E$ is then estimated to be 222 M$^{-1}$ vs. 246 M$^{-1}$ in the absence of the field. As can been, the present electric fields in the EFISH measurement are insufficient significantly affect the aggregation equilibria.

Teng-Man experiments on poled TMC-2 and TMC-3 based guest-host polyvinylphenol (PVP, $\epsilon_r$=4.5) films reveal very large EO coefficients ($r_{33}$) at 1310 nm, confirming the exceptional hyperpolarizabilities in these chromophores. The exact poling behavior of TMC-3/PVP guest-host films (FIG. 8) is presumably a result of the strong aggregation tendency of these zwitterions as discussed above, and which is also observed in less polar matrices, e.g., amorphous polycarbonate (APC, $\epsilon_r$=3), where only very weak EO responses are observed. Chromophores dipolar aggregation is clearly detrimental to the performance of EO materials. The aforementioned aggregation studies on TMC chromophores demonstrate how the aggregation can be studied quantitively in solution and how molecular modification of the chromophores can be utilized to minimize aggregation. However, while the dimerization constant determined in solution may not directly correlate with the degree of the aggregation in host polymers, it is reasonable to use it to estimate the order of magnitude of the aggregation effects in these guest-host materials. For example, the polarity of PVP ($\epsilon_r$=4.5) is close to that of chloroform ($\epsilon_r$=4.8) and the TMC-2 dimerization constant $K_d$ is estimated to be 13300 M$^{-1}$ in chloroform (vide supra). We can then estimate that the TMC-2 $K_d$≈13300 M$^{-1}$ in PVP. A TMC-2 doping level of 10 wt% in PVP corresponds to a concentration of $c_0$≈0.28 M, and it follows from $K_d$ that monomer concentration $c_M$≈0.003 M, so that ~99% of the TMC-2 chromophore molecules are predicted to be present in the form of dimers in PVP at room temperature. However, upon applying poling field (100 V/μm in the present experiments), the field-dependent dimerization constant $K_d^E$=7.14 M$^{-1}$ at room temperature can be derived, according to eq 10 (with a Lorentz local field factor of L=2.17). This is a significant shift of the dimerization equilibrium with monomer concentration, with $c_M$ changing to 0.11 M, so that ~40% of TMC-2 chromophores are present as dissociated monomer in the host at room temperature. Furthermore, since the present dimerization of the chromophore is an exothermic reaction with an expected negative dimerization enthalpy and entropy, an increase of the temperature will result in the decrease of dimerization constant $K_d$. Therefore, upon heating the polymer matrix during the poling, more chromophores will present as dissociated monomers. It can be seen that there still has room to realize the optimal values offered by such exceptional hyperpolarizabilities. Judging from the aforementioned crystallographic observations and spectroscopic aggregation studies, it is clear that bulky skeletal substituents should prevent close aggregation, and from recent successes that steric inhibition has had in dramatically improving bulk EO response, there is reason to believe that the present aggregation issues can be similarly addressed and that further enhanced $r_{33}$ values will be achieved.

Accordingly, this invention provides a series of theory-inspired, unconventional twisted π-electron system EO chromophores (e.g., representatives of which are designated as TM and TMC) have been designed and synthesized. Efficient synthetic approaches were developed to realize these sterically-hindered zwitterionic biaryls. All these new compounds have been fully characterized via conventional analytical/spectroscopic techniques. The TMC chromophores exhibit excellent thermal and chemical stability. Crystallographic analysis of these molecules reveals large and nearly invariant ring-ring dihedral twist angles (80°-89°) and highly charge-separated zwitterionic groundstates. This twist is governed primarily by o,o',o",o'''-substituted biaryl core and is practically independent of chromophore architecture. Optical spectroscopy of these chromophores reveals a twist-induced reduction of inter-ring charge transfer (CT) and strong negative solvatochromism, evidence of charge-separated zwitterionic structure in solution. The solid-state vs solution phase $^{13}C$ NMR, IR, and optical spectroscopic studies on these chromophores further support that zwitterionic groundstate structural characteristics observed in solid state persist unchanged in solution phase and that these chromophores exhibit a strong tendency for centrosymmetric aggregation in concentrated solution. Detailed information on the state of this aggregation, such as aggregation model, level, and binding energies, has been provided by a combination of techniques, including concentration-dependent optical spectroscopy, pulsed field gradient spin-echo (PGSE) NMR measurements, and X-ray crystallography. Most importantly, exceptional molecular hyperpolarizabilities of these unconventional chromophores have been achieved in this work, with EFISH-derived nonresonant μβ values as high as $-488,000 \times 10^{-48}$ esu at 1907 nm. Preliminary direct Teng-Man reflection measurement on guest-host poled polymers containing these chromophores reveal a very large electro-optic coefficient ($r_{33}$) of 320 pm/V at 1310 nm. Aggregation effects are also observed in these measurements and shown to be an issue to be addressed in future EO applications. In summary, this work shows twisted π-electron system chromophores to be promising candidates for EO applications and provides new insights into the design of molecule-based EO materials.

EXAMPLES OF THE INVENTION

The following non-limiting examples and data illustrate various aspects and features relating to the compounds, compositions, methods and/or device structures of the present invention, including the preparation and use of various chromophore compounds, together with their various moieties and substituents, as are available through the synthetic methodologies described herein. In comparison with the prior art, the present compounds, compositions, methods and/or devices provide results and data which are surprising, unexpected and contrary thereto. While the utility of this invention is illustrated through the use of several compounds and moieties or substituents thereon, together with certain polymeric and device-related components used therewith, it will be understood by those skilled in the art that comparable results are obtainable with various other compounds, compositions and device structures, as are commensurate with the scope of this invention.

Materials and Methods. All reagents were purchased from Aldrich Chemical Co. and used as received unless otherwise indicated. THF was distilled from sodium/benzophenone and methylene chloride from $CaCl_2$. Chloroform was dried and distilled from anhydrous $K_2CO_3$. Toluene was dried by passing through two packed columns of activated alumina and Q5 under $N_2$ pressure and was tested by benzyphenone ketyl in ether solution. The reagent 1-iodo-4-vinyl-benzene was purchased from Karl Industries Inc., and 2-propyl-1-heptanol from Narchem Co. The reagents 4-bromo-3,5-dimethyl-pyridine 1-oxide (1) and the ligand dicyclohexyl-(2-phenanthren-9-yl-phenyl)-phosphane (DCPPP) for catalytic Suzuki coupling were synthesized according to literature procedures. NMR spectra were recorded on a Varian Mercury-400 MHz or Varian INOVA-500 MHz spectrometer. Solid state $^{13}C$ CPMAS NMR spectra were recorded on a Varian VXR-300 MHz spectrometer at room temperature with spinning rates of 3.5-3.7 kHz, using a 5 mm zirconia rotor with Aurum caps. The cross-polarization contact time was 2.2 ms and the repetition time was 5.4 s. Mass spectra were recorded on a Micromass Quattro II Triple Quadrupole HPLC/MS/MS mass spectrometer. Elemental analyses were performed by Midwest Microlabs. Optical spectra were recorded on a Cary 5000 spectrophotometer. Emission spectra were recorded on a PTI QM2 Fluorescence Instrument. Thermal analysis was performed with a TA Instruments SDT 2960 simultaneous DTA-TGA instrument under $N_2$ at 1.0 atmosphere. The temperature ramp rate was 1.5° C./min. IR spectra were obtained on a Bio-Rad FTS-40 FTIR spectrometer. Cyclic voltammetry was performed with a BAS100 electrochemical analyzer, using a three-electrode cell (Carbon working electrode, Ag wire pseudo-reference electrode, and Pt wire counter electrode) with 0.1 M $Bu_4NPF_6$ in anhydrous MeCN as electrolyte. All the potentials are quoted vs. the ferrocene/ferrocenium (Fc/Fc+) couple internal standard.

Example 1

Synthesis of 2-bromo-5-methoxy-1,3-dimethyl-benzene. To a mixture of 4-bromo-3,5-dimethyl-phenol (40.2 g, 0.200 mol) and potassium carbonate (55.2 g, 0.400 mol) in acetone (200 mL) was added methyl iodide (24.9 mL, 0.600 mol) at room temperature under $N_2$. The reaction mixture was then refluxed at 65° C. for 8 h. After cooling to room temperature, the mixture was filtered, and the filtrate was concentrated in vacuo. The resulting clear liquid was distilled under reduced pressure (70° C./0.1 Torr) to give 42.4 g (99%) of title compound as a colorless liquid. $^1H$ NMR (400 MHz, $CDCl_3$): δ 6.663 (s, 2H), 3.778 (s, 3H), 2.402 (s, 61-1); $^{13}C$ NMR (100 MHz, $CDCl_3$): δ 158.165, 139.203, 118.357, 113.953, 55.520, 24.319. MS (EI): m/z 214 [$M^+$, $^{79}Br$ 100], 216 [$M^+$, $^{79}Br$, 96].

Example 2

Synthesis of 4-methoxy-2,6-dimethylphenylboronic acid (2). An oven-dried three-neck round-bottom flask equipped with two rubber septum-sealed addition funnels and a side-arm stopcock was evacuated and backfilled with $N_2$. Dry THF (100 mL) and 2-bromo-5-methoxy-1,3-dimethyl-benzene (21.5 g, 0.100 mol) were then added via syringe. The mixture was then cooled to −78° C. with stirring in a dry ice-acetone bath. Next, n-butyl lithium (2.5 M solution in hexane, 44 mL, 0.11 mol) was added dropwise via syringe with stirring over the course of 45 min at −78° C., and the mixture was allowed to stir at −78° C. for an additional 30 min. Triisopropyl borate (28.2 g, 0.150 mol) was then added dropwise via syringe over the course of 30 min at −78° C. After stirring at −78° C. for an additional 1 h, the mixture was quenched with saturated aqueous $NH_4Cl$ solution (100 mL), and the resulting mixture allowed to gradually warm to room temperature. The organic layer was next separated, and the aqueous layer was extracted with a mixture of ethyl acetate and THF (1:1, 50 mL×3). The combined organic layers were dried over $MgSO_4$, filtered, and concentrated in vacuo. The resulting sticky oil was suspended in hexane (100 mL) and stirred at room temperature for 30 min. The resulting solid was collected by filtration and washed with hexane to yield 14.9 g of the title compound as a colorless solid (83%). $^1H$ NMR (400 MHz, $CDCl_3$): δ 6.552 (s, 2H), 4.684 (s, 2H), 3.780 (s, 3H), 2.370 (s, 6H). $^{13}C$ NMR (100 MHz, $CDCl_3$): δ 141.714, 122.607, 112.325, 111.815, 55.238, 22.663. MS (EI): m/z 180.1 [$M^+$, 100]. Anal. Calcd. For $C_9H_{13}BO_3$: C, 60.05; H, 7.28. Found: C, 60.27; H, 7.42.

Example 3

Synthesis of 4-(4-methoxy-2,6-dimethyl-phenyl)-3,5-dimethyl-pyridin-1-ol (3). A flame-dried sealable Schlenk tube was charged with 4-bromo-3,5-dimethyl-pyridine 1-oxide (1; 10.1 g, 50.0 mmol), 2 (18.0 g, 100 mmol), $Pd_2(dba)_3$ (0.915 g, 1.00 mmol), dicyclohexyl-(2-phenanthren-9-yl-phenyl)-phosphane (1.8 g, 4.0 mmol), and $K_3PO_4$ (31.9 g, 150 mmol). The Schlenk tube was next evacuated and backfilled with $N_2$. Then, degassed dry toluene (100 mL) was added via syringe under $N_2$. The Schlenk tube was sealed, and the mixture was stirred at 120° C. for 48 h. The reaction mixture was subsequently cooled to room temperature, diluted with methylene chloride (500 mL), filtered, and concentrated in vacuo. The resulting dark brown oil was allowed to stand at room temperature until the colorless crystalline product separated from the liquid. The solid was then collected by filtration and identified as the pure title compound (6.55 g). The filtrate was purified by flash chromatography eluting with 95:5 $CHCl_3$: methanol to afford an additional 0.23 g of the title compound. The combined yield was 6.78 g (53%): mp 194-195° C.; $^1H$ NMR (400 MHz, $CD_2Cl_2$): δ 7.990 (s, 2H), 6.705 (s, 2H), 3.798 (s, 3H), 1.892 (s, 6H), 1.842 (s, 6H); $^{13}C$ NMR (125 MHz, $CD_2Cl_2$): δ 159.771, 139.578, 137.663, 137.187, 135.775, 128.289, 113.709, 55.605, 20.198, 17.087; MS (ESI): m/z 258.4 [$(M+H)^+$,100]; Anal. Calcd. For $C_{16}H_{19}NO_2$: C, 74.68; H, 7.44; N, 5.44. Found: C, 74.54; H, 7.40; N, 5.51.

Example 4

Synthesis of 4-(4-methoxy-2,6-dimethyl-phenyl)-3,5-dimethyl-pyridine (4). To a mixture of 3 (6.55 g, 25.5 mmol) and palladium (10 wt. % on activated carbon; 3.05 g, 2.8 mmol) in acetic acid (150 mL) was added sodium hypophosphite hydrate (6.7 g, 63 mmol) in a single portion at 80° C. The reaction mixture was stirred at 80° C. under $N_2$ for 12 h, then filtered and concentrated in vacuo. The resulting light-yellow oil was dissolved in chloroform (250 mL) and washed successively with saturated $NaHCO_3$ (aq.), water, and brine. The organic layer was then separated, dried over $MgSO_4$, filtered, and concentrated in vacuo. The resulting pale-yellow solid was purified by flash chromatography on silica gel eluting with 1:1 hexane:ethyl acetate, to give 6.01 g (97.9%) of the title compound as colorless solid: mp 87-88° C.; $^1H$ NMR (400 MHz, $CD_2Cl_2$): δ 8.334 (s, 2H), 6.707 (s, 2H), 3.804 (s, 3H), 1.892 (s, 6H), 1.851 (s, 6H); $^{13}C$ NMR (100 MHz, $CD_2Cl_2$): δ 159.330, 148.939, 148.420, 136.373, 131.905, 129.958, 113.489, 55.556, 20.188, 16.831; MS (APCI): m/z 242.2 [$(M+H)^+$,100]; Anal. Calcd. For $C_{16}H_{19}NO$: C, 79.63; H, 7.94; N, 5.80. Found: C, 79.39; H, 7.94; N, 5.75.

Example 5

Synthesis of 4-(4-methoxy-2,6-dimethyl-phenyl)-1,3,5-trimethyl-pyridinium iodide (5). To a solution of 4 (0.241 g, 1.00 mmol) in dry $CH_2Cl_2$ (5 mL) was added dropwise iodomethane (0.32 mL, 0.729 g, 5.10 mmol) at room temperature under $N_2$. The reaction mixture was then refluxed at 60° C. under $N_2$ for 1 h. After cooling to room temperature, the mixture was concentrated in vacuo to give the corresponding methylpyridinium iodide salt as an analytically pure yellow solid (0.382 g, 99.8%). mp 220-221° C.; $^1H$ NMR (400 MHz, $CD_2Cl_2$): δ 9.079 (s, 2H), 6.751 (s, 2H), 4.579 (s, 3H), 3.881 (s, 3H), 2.135 (s, 6H), 1.854 (s, 6H); $^{13}C$ NMR (100 MHz, $CD_2Cl_2$): δ 160.512, 159.866, 143.124, 138.802, 135.527, 125.927, 114.217, 55.692, 48.686, 20.188, 17.331; Anal. Calcd. For $C_{17}H_{22}INO$: C, 53.27; 1-1, 5.79; N, 3.65. Found: C, 53.15; H, 5.79; N, 3.57.

Example 6

Synthesis of 4-(3,5-dimethyl-pyridin-4-yl)-3,5-dimethyl-phenol (6). To stirring pyridine (3 mL) was slowly added concentrated hydrochloric acid (3.3 mL). The reaction flask was then fitted for distillation, and water was distilled from the mixture until the temperature rose to 210° C. After cooling to 140° C., 4 (0.241 g, 1.00 mmol) was added to the above mixture, and the reaction flask was fitted with a reflux condenser connected to a $N_2$ source. The yellow mixture was stirred and refluxed for 3 h at 210° C. The resulting reaction mixture was then diluted with warm water (3 mL) and slowly poured into hot water (20 mL). The resulting yellow solution was cooled to room temperature and neutralized with dilute NaOH solution to pH ~7. The resulting colorless precipitate was then collected by filtration and washed with water to give 0.208 g (91.6%) of analytically pure product as a colorless solid: mp>270° C. (decomp.); $^1H$ NMR (500 MHz, DMSO-$d_6$): δ 9.245 (s, 1H), 8.337 (s, 2H), 6.579 (s, 2H), 1.841 (s, 6H), 1.729 (s, 6H); $^{13}C$ NMR (125 MHz, DMSO-$d_6$): δ 156.400, 148.191, 147.630, 134.949, 131.015, 127.197, 114.493, 19.359, 16.098; MS (ESI): m/z 228.4 [$(M+H)^+$, 100]; Anal. Calcd. For $C_{15}H_{17}NO$: C, 79.26; H, 7.54; N, 6.16. Found: C, 79.14; H, 7.58; N, 6.18.

Example 7

Synthesis of 4-(4-hydroxy-2,6-dimethyl-phenyl)-1,3,5-trimethyl-pyridinium iodide (7). To a stirring solution of 6 (0.113 g, 0.500 mmol) in anhydrous methanol (10 mL) was added dropwise iodomethane (0.5 mL, 0.660 g, 2.75 mmol) at room temperature under $N_2$. The reaction mixture was then stirred at 60° C. under $N_2$ overnight. After cooling to room temperature, the mixture was concentrated in vacuo to give the corresponding methylpyridinium iodide salt as an analytically pure yellow solid (0.184 g, 99.4%). mp 257-258° C.; $^1H$ NMR (500 MHz, DMSO-$d_6$): δ 9.562 (s, 1H), 8.898 (s, 2H), 6.645 (s, 2H), 4.295 (s, 3H), 2.015 (s, 6H), 1.760 (s, 6H); $^{13}C$ NMR (125 MHz, DMSO-$d_6$): δ 157.588, 157.448, 143.158, 136.942, 134.675, 124.179, 114.988, 47.297, 19.162, 16.527; MS (ESI): m/z 242.4 [$(M-I)^+$, 100]; Anal. Calcd. For $C_{16}H_{20}INO·H_2O$: C, 49.62; H, 5.73; N, 3.62; I, 32.77. Found: C, 50.08; H, 5.52; N, 3.65; I, 33.49.

Example 8

Synthesis of 3,5-dimethyl-4-(1,3,5-trimethyl-1H-pyridin-4-ylidene)-cyclohexa-2,5-dienone (TM-1). To the methylpyridinium iodide salt 7 (0.184 g, 0.500 mmol) was added dropwise a solution of sodium methoxide in methanol (1.2 mL, 0.5 M). The color of the mixture immediately changed from yellow to red. After stirring at room temperature for 10 min, the solvent was removed under reduced pressure. The resulting solid was then recrystallized from anhydrous methanol/THF to afford the orange title compound as a complex with NaI (0.382 g, 98%): $^1$H NMR (400 MHz, DMSO-$d_6$): δ 8.818 (s, 2H), 5.983 (s, 2H), 4.265 (s, 3H), 2.055 (s, 6H), 1.566 (s, 6H); $^{13}$C NMR (100 MHz, DMSO-$d_6$): δ 161.235, 142.173, 137.851, 132.019, 118.598, 114.039, 46.917, 19.574, 16.754; MS (ESI): m/z 242.4 [(M+H)$^+$,100]; HRMS (EI): m/z 241.1463 [M$^+$]; calcd, 241.1467. Anal. Calcd. for $C_{16}H_{19}NO\cdot NaI$: C, 49.12; H, 4.90; N, 3.58. Found; C, 49.04; H, 5.40; N, 3.49.

Example 9

Synthesis of trifluoromethanesulfonic acid 4-(3,5-dimethyl-pyridin-4-yl)-3,5-dimethyl-phenyl ester (8). An oven-dried Schlenk flask was charged with 6 (0.681 g, 3.00 mmol). The flask was then evacuated and backfilled with $N_2$. Dry pyridine (6 mL) was next added via syringe and the mixture was stirred at 0° C. Trifluoromethanesulfonic anhydride (1.2 mL, 7.2 mmol) was then added dropwise via syringe, and the reaction mixture was allowed to warm to room temperature, followed by stirring at room temperature for 6 h. The resulting mixture was next poured into ice-water and extracted with $CH_2Cl_2$ (3×20 mL). The organic layer was dried over $Na_2SO_4$, filtered, and concentrated in vacuo to give a brown oil. The crude product was purified by flash chromatography on silica gel, eluting with ethyl acetate to give 1.0 g (92.8%) of the title compound as colorless crystals: mp 68-69° C.; $^1$H NMR (400 MHz, $CD_2Cl_2$): δ 8.375 (s, 2H), 7.108 (s, 2H), 1.926 (s, 6H), 1.885 (s, 6H); $^{13}$C NMR (100 MHz, $CD_2Cl_2$): δ 149.336, 149.202, 146.509, 138.284, 138.020, 130.914, 120.668, 117.675, 20.134, 16.694; $^{19}$F NMR (376 MHz, $CD_2Cl_2$): −73.976; MS (ESI): m/z 360.2-[(M+H)$^+$, 100] Anal. Calcd. for $C_{16}H_{16}F_3NO_3S$: C, 53.48; H, 4.49; N, 3.90. Found; C, 53.78; H, 4.82; N, 3.64.

Example 10

Synthesis of 4-(3,5-dimethylpyridin-4-yl)-N-(diphenylmethylene)-3,5-dimethyl-benzenamine (9). A flame-dried sealable Schlenk tube was charged with triflate 8 (0.359 g, 1.00 mmol), $Cs_2CO_3$ (0.456 g, 1.40 mmol), Pd(OAc)$_2$ (6.7 mg, 0.030 mmol), and BINAP (28.2 mg, 0.0450 mmol). The tube was evacuated and then backfilled with $N_2$. Next, a solution of benzophenone imine (0.224 g, 1.20 mmol) in dry THF (4 mL) was added with stirring under an $N_2$ flow. The Schlenk tube was sealed, the mixture was degassed by three freeze-thaw cycles, and backfilled with $N_2$. The mixture was then stirred at 65° C. for 15 h. The reaction mixture was next cooled to room temperature, diluted with methylene chloride (40 mL), filtered, and the filtrate was concentrated in vacuo. The resulting yellow solid was purified by flash chromatography on silica gel, eluting with 1:1 hexane:ethyl acetate, to give 0.381 g (97.7%) of the title compound as a colorless solid: mp 44-45° C.; $^1$H NMR (400 MHz, $CD_2Cl_2$): δ 8.305 (s, 2H), 7.774 (d, 2H, J=8.0 Hz), 7.494-7.408 (m, 3H), 7.271 (m, 3H), 7.144 (d, 2H, J=6.8 Hz), 6.476 (s, 2H), 1.828 (s, 6H), 1.706 (s,6H); $^{13}$C NMR (100 MHz, $CD_2Cl_2$): δ 168.647, 151.523, 148.783, 148.611, 140.013, 136.737, 135.099, 132.206, 131.678, 131.114, 130.040, 129.685, 128.912, 128.583, 128.038, 120.459, 19.842, 16.594; MS (ESI): m/z 391.5 [(M+H)$^+$, 100]; Anal. Calcd. for $C_{28}H_{26}N_2$: C, 86.12; H, 6.71; N, 7.17. Found; C, 85.86; H, 6.74; N, 7.17.

Example 11

Synthesis of 4-(3,5-dimethyl-pyridin-4-yl)-3,5-dimethyl-phenylamine (10). To a solution of 9 (0.36 g, 0.93 mmol) in anhydrous MeOH (10 mL) at room temperature was added with stirring NaOAc (0.197 g, 2.40 mmol) and hydroxylamine hydrochloride (0.125 g, 1.80 mmol). The reaction mixture was then stirred at room temperature for 1.5 h. The resulting solution was next partitioned between an aqueous 0.1 M NaOH solution (50 mL) and $CH_2Cl_2$ (50 mL×3). The organic layer was separated, dried over anhydrous $Na_2SO_4$, filtered, and concentrated in vacuo. The crude product was next purified by flash chromatography on silica gel, eluting with ethyl acetate, to give 0.207 g (99.0%) of the title compound as yellow solid: mp 134-135° C.; $^1$H NMR (400 MHz, $CD_2Cl_2$): δ 8.311 (s, 2H), 6.482 (s, 2H), 1.903 (s, 6H), 1.769 (s, 6H); $^{13}$C NMR (100 MHz, $CD_2Cl_2$): δ 149.130, 148.547, 146.482, 135.882, 132.333, 127.592, 114.635, 19.979, 16.876; MS (ESI): m/z 227.5 [(M+H)$^+$, 100]; Anal. Calcd. for $C_{15}H_{18}N_2$: C, 79.61; H, 8.02; N, 12.38. Found; C, 79.26; H, 7.91; N, 12.04.

Example 12

Synthesis of 4-(4-iodo-2,6-dimethyl-phenyl)-3,5-dimethyl-pyridine (11). To a stirring suspension of nitrosonium tetrafluoroborate (0.876 g, 7.50 mmol) in dry acetonitrile (10 mL) was added dropwise via syringe a solution of 10 (0.904 g, 4.00 mmol) in dry acetonitrile (15 mL) under $N_2$ at −30° C. The reaction mixture was next stirred at −30° C. for 1 h. To the resulting yellow solution was then added dropwise in the dark a solution of anhydrous NaI (1.125 g, 7.50 mmol) in dry acetonitrile (10 mL) under $N_2$ at −30° C. The reaction mixture was covered with aluminum foil, allowed to gradually warm to room temperature, and stirred at room temperature overnight. The resulting red solution was next decolorized using an aqueous solution of $Na_2S_2O_3$ and extracted with chloroform (50 mL×3). The organic layer was separated, dried over anhydrous $Na_2SO_4$, filtered, and concentrated in vacuo. The crude product was purified by flash chromatography on silica gel, eluting with 8:1 chloroform:ethyl acetate, to give 0.96 g (72%) of the title compound as a yellow solid: mp 242-243° C.; NMR (400 MHz, $CDCl_3$): δ 8.397 (s, 2H), 7.520 (s, 2H), 1.908 (s, 6H), 1.838 (s, 6H); $^{13}$C NMR (100 MHz, $CDCl_3$): δ 148.611, 147.520, 136.983, 136.774, 130.841, 93.681, 19.488, 16.758; MS (ESI): m/z 338.2 [(M+H)$^+$, 100]; Anal. Calcd. for $C_{15}H_{16}IN$: C, 53.43; H, 4.78; N, 4.15. Found; C, 52.91; H, 4.72; N, 4.07.

Example 13

Synthesis of 2,6-di-tert-butyl-4-vinyl-phenol (12). A solution of 3,5-di-tert-butyl-4-hydroxycinnamic acid (2.77 g, 10 mmol) in dry DMF (20 mL) was refluxed at 150° C. under $N_2$ for 2 h with stirring. The resulting mixture was then poured into water (200 mL) and extracted with chloroform (100 mL). The organic layer was separated, dried over anhydrous $Na_2SO_4$, filtered, and concentrated in vacuo. The crude product was purified by flash chromatography on silica gel eluting with hexane, to give 2.094 g (90.2%) of the title compound as a colorless solid: mp 51-51.5° C.; $^1$H NMR (400 MHz, $CDCl_3$): δ 7.248 (s, 2H), 6.666 (d×d, 1H, J=10.8 Hz, $J_2$=17.6 Hz), 5.587 (d, 1H, J=16.8 Hz), 5.241 (s, 1H), 5.094 (d, 1H, J=10.8 Hz), 1.456 (s, 18H); $^{13}$C NMR (100 MHz, $CDCl_3$): δ 153.980, 137.529, 136.055, 129.040, 123.216, 110.996, 34.565, 30.507; Anal. Calcd. for $C_{16}H_{24}O$: C, 82.70; H, 10.41. Found; C, 83.08; H, 10.37.

Example 14

Synthesis of 2,6-di-tert-butyl-4-{2-[4-(3,5-dimethyl-pyridin-4-yl)-3,5-dimethyl-phenyl]-vinyl}-phenol (13). A flame-dried sealable Schlenk tube was charged with 11 (1.69 g, 5.0 mmol), 12 (2.32 g, 10.0 mmol), Pd(OAc)$_2$ (112 mg, 0.50 mmol), and PPh$_3$ (131 mg, 0.50 mmol), evacuated, and then backfilled with N$_2$. Next, dry Et$_3$N (10 mL) was added under an N$_2$ flow. The Schlenk tube was next sealed, the mixture was degassed by 3 freeze-thaw cycles, and backfilled with N$_2$. The Schlenk tube was then wrapped with aluminum foil and stirred at 100° C. for 36 h. The reaction mixture was then cooled to room temperature, diluted with methylene chloride (50 mL), filtered through a thin pad of silica gel, and concentrated in vacuo to afford a red solid. The crude product was purified by flash chromatography on silica gel, eluting with 3:1 hexane:ethyl acetate to give the title compound 2.01 g (91.2%) as a colorless solid: mp 234-235° C.; $^1$H NMR (400 MHz, CDCl$_3$): δ 8.402 (s, 2H), 7.371 (s, 2H), 7.307 (s, 2H), 7.133 (d, 1H, J=16.4 Hz), 6.936 (d, 1H, J=16.0 Hz), 5.331 (s, 1H), 1.951 (s, 6H), 1.911 (s, 6H), 1.499 (s, 18H); $^{13}$C NMR (100 MHz, CDCl$_3$): δ 153.971, 148.630, 148.502, 137.347, 136.301, 135.928, 134.817, 131.251, 129.595, 128.876, 125.837, 125.709, 123.598, 34.638, 30.534, 19.997, 16.822; HRMS (EI): m/z 441.3023 [M$^+$]; calcd, 441.3032; Anal. Calcd. for C$_{31}$H$_{39}$NO.H$_2$O: C, 81.00; H, 8.99; N, 3.05. Found; C, 81.01; H, 8.64; N, 3.02.

Example 15

Synthesis of 2,6-di-tert-butyl-4-{2-[4-(3,5-dimethyl-1-octyl-1H-pyridin-4-ylidene)-3,5-dimethyl-cyclohexa-2,5-dienylidene]-ethylidene}-cyclohexa-2,5-dienone (TM-2). To a stirring solution of 13 (0.150 mg, 0.34 mmol) in dry CH$_2$Cl$_2$ (5 mL) was added dropwise 1-iodooctane (0.6 mL, 0.792 g, 3.3 mmol) at room temperature. The reaction mixture was then stirred at 80° C. under N$_2$ for 1 day. After cooling to room temperature, the mixture was next concentrated in vacuo and washed with hexane (20 mL) to give the corresponding n-octyl-pyridinium iodide salt 14 as an analytically pure yellow solid (0.211 g, 95.4%). To a suspension of 12 (0.136 g, 0.2 mmol) in dry methanol (1 mL) was added dropwise a solution of sodium methoxide in methanol (0.5 mL, 0.5 M) at room temperature. A clear reddish solution was obtained from which an orange precipitate immediately formed. The precipitate was collected by filtration and washed with dry methanol to give analytically pure product (0.096 g, 86.8%) as a brown solid: mp>280° C.; $^1$H NMR (400 MHz, CD$_3$OD): δ 8.816 (s, 2H), 7.395 (s, 2H), 7.317 (s, 2H), 7.160 (d, 1H, J=16.4 Hz), 6.841 (d, 1H, J=16.0 Hz), 4.547 (t, 2H, J=8.0 Hz), 2.146 (s, 6H), 2.065 (m, 2H), 1.912 (s, 6H), 1.450 (s, 18H), 1.307 (m, 10H), 0.895 (s, 3H); $^{13}$C NMR (100 MHz, CD$_3$OD): δ 159.608, 154.285, 142.183, 139.217, 138.198, 136.351, 133.757, 131.838, 130.964, 128.398, 126.424, 124.704, 123.758, 61.530, 34.624, 32.031, 31.931, 30.493, 29.292, 26.399, 22.850, 20.057, 17.463, 14.352; HRMS (EI): m/z 553.4263 [M$^+$]; calcd, 553.4284; Anal. Calcd. for C$_{39}$H$_{55}$NO.2H$_2$O: C, 79.41; H, 10.08; N, 2.37. Found; C, 79.71; H, 9.63; N, 2.14.

Example 16

Synthesis of 2-[4-(3,5-dimethyl-pyridin-4-yl)-3,5-dimethyl-phenyl]-malononitrile (15). To an ice-cooled suspension of NaH (0.12 g, 5.0 mmol) in anhydrous 1,2-dimethoxyethane (8 mL) was added dropwise via syringe a solution of malononitrile (0.165 g, 2.50 mmol) in anhydrous 1,2-dimethoxyethane (2 mL) under N$_2$. The mixture was stirred for 1 h at room temperature under N$_2$. Next, 11 (0.674 g, 2.00 mmol) and tetrakis(triphenyphosphine)palladium(0) (0.232 g, 0.200 mmol) were added to the resulting pink suspension under an N$_2$ flow. The reaction mixture was next stirred at 85° C. under N$_2$ for 5 h. The solvent was then removed under reduced pressure. The resulting solid was washed with benzene (20 mL), dissolved in water, and filtered to give a dark-yellow aqueous solution. This solution was neutralized with 5% HCl to pH=7, and the resulting yellow precipitate was collected by filtration to give an orange solid. The crude product was purified by flash chromatography on silica gel eluting with 1:1 hexane:ethyl acetate, to give 0.525 g (95.5%) of the title compound as red solid: mp 58-60° C.; $^1$H NMR (400 MHz, CDCl$_3$): δ 8.412 (s, 2H), 7.286 (s, 2H), 5.100 (s, 1H), 1.946 (s, 6H), 1.895 (s, 6H); $^{13}$C NMR (100 MHz, CDCl$_3$): δ 149.066, 146.564, 139.513, 137.283, 130.441, 126.692, 125.518, 112.024, 28.059, 19.988, 16.704; Anal. Calcd. for C$_{18}$H$_{17}$N$_3$.H$_2$O: C, 73.69; H, 6.53; N, 14.32. Found; C, 73.36; H, 6.35; N, 14.07.

Example 17

Synthesis of 2-[3,5-dimethyl-4-(1,3,5-trimethyl-1H-pyridin-4-ylidene)-cyclohexa-2,5-dienylidene-malononitrile (TMC-1). Methyl triflate (180 mg, 124 µL, 1.10 mmol) was added dropwise to a solution of 15 (275 mg, 1.00 mmol) in dry CH$_2$Cl$_2$ (1 mL). After stirring at room temperature for 2 h, yellow oil separated from mixture. The solvent was next removed under reduced pressure to afford methylpyridinium salt 16 as an analytically pure yellow solid. To the resulting solid was added 10 wt % aqueous NaOH solution (5 mL). The resulting reddish suspension was stirred at room temperature for 30 min, filtered, and washed with water to yield an orange solid. The crude product can be purified by recrystallization from acetone, to give 230 mg (79.6%) of the title compound as orange solid: mp>230° C. (dec.); $^1$H NMR (500 MHz, acetone-d$_6$): δ 8.873 (s, 2H), 6.704 (s, 2H), 4.556 (s, 3H), 2.166 (s, 6H), 1.738 (s, 6H); $^{13}$C NMR (125 MHz, acetone-d$_6$): δ 161.532, 145.473, 143.825, 139.553, 133.209, 126.516, 122.345, 118.840, 48.374, 19.830, 17.335; MS (high resolution, EI): m/z 289.1569 [M$^+$]; calcd, 289.1579.

Example 18

Synthesis of 2-{4-[3,5-dimethyl-1-(2-propyl-heptyl)-1H-pyridin-4-ylidene]-3,5-dimethyl-cyclohexa-2,5-dienylidene}-malononitrile (TMC-2). To a solution of 2-propyl-1-heptanol (0.81 g, 5.1 mmol) in dry CH$_2$Cl$_2$ (15 mL) was added dropwise a solution of trifluoromethanesulfonic anhydride (1.77 g, 6.10 mmol) in the same solvent (5 mL). After stirring at room temperature for 20 min, the reaction mixture was poured into ice (40 mL) and neutralized with saturated aqueous NaHCO$_3$ solution. The organic layer was separated, washed with water, dried over anhydrous Na$_2$SO$_4$, filtered, and concentrated in vacuo to yield nearly pure 2-propyl-1-heptyl triflate as a purple liquid (1.40 g, 94.1%). The 2-propyl-1-heptyl triflate (0.319 g, 1.10 mmol) was next added dropwise to a solution of 15 (0.275 g, 1.00 mmol) in dry CH$_2$Cl$_2$ (10 mL), and the reaction mixture was stirred at room temperature for 12 h. A solution of sodium methoxide in methanol (2.4 mL, 0.5 M) was then added dropwise to the resulting solution of pyridinium salt 17. The color of the mixture immediately changed from yellow to purple. After stirring at room temperature for 10 min, the solvent was removed under reduced pressure. The resulting purple solid was then partitioned between water (20 mL) and CH$_2$Cl$_2$ (20 mL). The organic layer was separated, dried over anhydrous Na$_2$SO$_4$, filtered, and concentrated in vacuo. The crude product was next purified by flash chromatography on silica gel eluting with 4:100 methanol:CH$_2$Cl$_2$, to give 0.278 g (66.9%)

of the title compound as an orange solid: mp 276-278° C.; $^1$H NMR (400 MHz, DMSO-d$_6$): δ 8.969 (s, 2H), 6.591 (s, 2H), 4.421 (t, 2H, J=5.6 Hz), 2.114 (m, 1H), 2.067 (s, 6H), 1.704 (s, 6H), 1.229-1.190 (m, 12H), 0.836 (m, 6H); $^{13}$C NMR (125 MHz, DMSO-d$_6$): δ 159.170, 142.273, 142.082, 137.669, 132.328, 125.659, 122.083, 117.561, 63.995, 38.500, 32.713, 31.339, 30.165, 27.600, 25.025, 21.849, 19.165, 18.846, 16.653, 14.188, 13.897; MS (high resolution, EI): m/z 415.2985 [M$^+$]; calcd, 415.2987; Anal. Calcd. for C$_{28}$H$_{37}$N$_3$.1/3H$_2$O: C, 79.76; H, 9.00; N, 9.97. Found; C, 79.92; H, 8.87; N, 9.97.

Example 19

Synthesis of 2-(4-vinyl-phenyl)-malononitrile (18). To an ice-cooled suspension of NaH (0.792 g, 33.0 mmol) in anhydrous 1,2-dimethoxyethane (20 mL) was added dropwise via syringe a solution of malononitrile (0.99 g, 15 mmol) in anhydrous 1,2-dimethoxyethane (5 mL) under N$_2$. The mixture was stirred for 1 h at room temperature under N$_2$. Next, 1-iodo-4-vinyl-benzene (1.15 g, 5.00 mmol), dry THF (15 mL), and tetrakis(triphenyphosphine)palladium(0) (0.58 g, 0.50 mmol) were added to the resulting pink suspension under an N$_2$ flow, and the reaction mixture stirred at 85° C. for 2 h. After cooling to room temperature, the reaction mixture was poured into ice, neutralized with 10% HCl, and extracted with CH$_2$Cl$_2$ (100 mL). The organic layer was separated, dried over anhydrous Na$_2$SO$_4$, and concentrated in vacuo. The crude product was then purified by flash chromatography on silica gel eluting with 1:1 hexane:CH$_2$Cl$_2$, to give 0.603 g (71.8%) of the title compound as pale yellow solid: mp 40-42° C. ° C.; $^1$H NMR (400 MHz, CDCl$_3$): δ 7.526 (d, 2H, J=7.6 Hz), 7.462 (d, 2H, J=7.6 Hz), 6.738 (dxd, 1H, J=17.6 Hz, J$_2$=10.8 Hz), 5.846 (d, 1H, J=17.6 Hz), 5.398 (d, 1H, J=10.8 Hz), 5.075 (s, 1H); $^{13}$C NMR (100 MHz, CDCl$_3$): δ 139.840, 135.372, 127.766, 127.556, 125.245, 116.619, 111.897, 28.050; Anal. Calcd. for C$_{11}$H$_8$N$_2$: C, 78.55; H, 4.79; N, 16.66. Found; C, 78.76; H, 4.75; N, 16.02.

Example 20

Synthesis of 2-(4-{2-[4-(3,5-dimethyl-pyridin-4-yl)-3,5-dimethyl-phenyl]-vinyl}-phenyl)-malononitrile (19). A flame-dried sealable Schlenk tube was charged with 11 (3.37 g, 10.0 mmol), 18 (2.52 g, 15.0 mmol), Pd(OAc)$_2$ (224 mg, 1.00 mmol), and PPh$_3$ (262 mg, 1.00 mmol), evacuated, and then backfilled with N$_2$. Next, dry Et$_3$N (5 mL) and dry DMF (10 mL) were added under an N$_2$ flow. The Schlenk tube was sealed, and the mixture was degassed by 3 freeze-thaw cycles and backfilled with N$_2$. The mixture was then covered with aluminum foil and stirred at 100° C. for 2 days. The reaction mixture was next cooled to room temperature, poured into water, neutralized with dilute HCl to pH=7, and extracted with CH$_2$Cl$_2$ (3×50 mL). The organic layer was dried over Na$_2$SO$_4$, filtered, and concentrated in vacuo. The crude product was then purified by flash chromatography on silica gel, eluting with 1:1 hexane:ethyl acetate to give 2.09 g (55.4%) of the title compound as red solid: mp 58-60° C.; $^1$H NMR (400 MHz, CDCl$_3$): δ 8.405 (s, 2H), 7.640 (d, 2H, J=8.0 Hz), 7.506 (d, 2H, J=8.0 Hz), 7.337 (s, 2H), 7.160 (s, 2H), 1.936 (s, 6H), 1.929 (s, 6H); $^{13}$C NMR (100 MHz, CDCl$_3$): δ 148.657, 148.093, 139.804, 137.383, 135.973, 135.218, 130.978, 127.911, 127.757, 126.774, 126.410, 124.863, 111.915, 28.096, 19.988, 16.749; MS (ESI): m/z 378.5 [M$^+$+H, 100]; MS (high resolution, EI): m/z 377.1878 [M$^+$]; calcd, 377.1892; Anal. Calcd. for C$_{26}$H$_{23}$N$_3$.1/2H$_2$O: C, 80.80; H, 6.26; N, 10.87. Found; C, 80.22; H, 6.32; N, 10.28.

Example 21

Synthesis of 2-[4-(2-{4-[3,5-dimethyl-1-(2-propyl-heptyl)-1H-pyridin-4-ylidene]-3,5-dimethyl-cyclohexa-2,5-dienylidene}-ethylidene)-cyclohexa-2,5-dienylidene]-malononitrile (TMC-3). To a solution of 2-propyl-1-heptanol (0.81 g, 5.1 mmol) in dry CH$_2$Cl$_2$ (15 mL) was added dropwise a solution of trifluoromethanesulfonic anhydride (1.77 g, 6.10 mmol) in the same solvent (5 mL). After stirring at room temperature for 20 min, the reaction mixture was poured into ice (40 mL), and neutralized with saturated aqueous NaHCO$_3$ solution. The organic layer was separated, washed with water, dried over anhydrous Na$_2$SO$_4$, filtered, and concentrated in vacuo to give nearly pure 2-propyl-1-heptyl triflate as purple liquid (1.40 g, 94.1%). Next, 2-propyl-1-heptyl triflate (0.319 g, 1.10 mmol) was added dropwise to a solution of 19 (0.377 g, 1.00 mmol) in dry CH$_2$Cl$_2$ (20 mL). The reaction mixture was stirred at room temperature for 4 h. A solution of sodium methoxide in methanol (2.4 mL, 0.5 M) was then added dropwise to the resulting solution of pyridinium salt 20. The color of the mixture immediately changed from yellow to red. After stirring at room temperature for 10 min, the solvent was removed under reduced pressure. The resulting purple solid was then partitioned between water (50 mL) and CH$_2$Cl$_2$ (50 mL). The organic layer was separated, dried over anhydrous Na$_2$SO$_4$, filtered, and concentrated in vacuo. The crude product was purified by flash chromatography on silica gel eluting with 4:100 methnol:CH$_2$Cl$_2$, to give 0.340 g (65.7%) of the title compound as purple solid: mp 161-162° C.; $^1$H NMR (400 MHz, DMSO-d$_6$): δ 9.039 (s, 2H), 7.418 (s, 2H), 7.286 (d, 2H, J=8.0 Hz), 7.145 (d, 1H, J=16.4 Hz), 6.919 (d, 1H, J=16.4 Hz), 6.739 (d, 2H, J=7.6 Hz), 4.453 (m, 2H, J=5.2 Hz), 2.125 (m, 1H), 2.074 (s, 6H), 1.859 (s, 6H), 1.319-1.219 (m, 12H), 0.849 (m, 6H); $^{13}$C NMR (125 MHz, DMSO-d$_6$): δ 157.523, 142.592, 141.882, 138.688, 136.859, 133.320, 131.364, 129.981, 126.942, 125.704, 125.468, 121.582, 118.070, 64.195, 38.546, 32.695, 31.366, 30.156, 29.419, 25.061, 21.894, 19.010, 18.855, 16.581, 14.215, 13.942; MS (high resolution, EI): m/z 517.3451 [M$^+$]; calcd, 517.3457; Anal. Calcd. for C$_{36}$H$_{43}$N$_3$.1/3H$_2$O: C, 82.56; H, 8.40; N, 8.02. Found; C, 82.59; H, 8.11; N, 8.36.

Example 22

Single Crystal X-Ray Diffraction. All diffraction measurements were carried out on a Bruker SMART CCD diffractometer with graphite monochromated MoK$_\alpha$ (0.71073 Å) radiation. Data were collected using the Bruker SMART detector, processed using SAINT-NT package from Bruker, and were corrected for Lorentz and polarization effects. The structures were solved by direct methods (SHELXTL-90) and expanded using Fourier techniques (SHELXTL-97). The non-hydrogen atoms were refined anisotropically. Hydrogen atoms on water molecules of solvation were refined with group isotropic displacement parameters. The remaining hydrogen atoms were included in idealized positions, but not refined. All calculations were performed using the Bruker SHELXTL9 crystallographic software package.

Example 23

Pulsed Field Gradient Spin-Echo (PGSE) NMR Spectroscopy. $^1$H PGSE NMR measurements were performed by using the standard stimulated echo pulse sequence on a Bruker AVANCE DRX 400 spectrometer equipped with a GREAT 1/10 gradient unit and a QNP probe with a Z-gradient coil at 295.7 K without spinning. The shape of the gradients was rectangular, their duration ($\delta$) was 4 ms, and their strength (G) was varied during the experiments. All spectra were acquired using 32K points and a spectral width of 5000 Hz, and were processed with a line broadening of 1.0 Hz. The semi-logarithmic plots of $\ln(I/I_0)$ vs $G^2$ were fitted using a standard linear regression algorithm; the R factor was always higher than 0.99. Different values of "nt" (number of transients) and number of different gradient strengths (G) were used for different samples, depending on solution viscosity and solute concentration. The two TMC ortho methyl group resonances (one from each ring) were used for the analysis. The dependence of the resonance intensity (I) on a constant diffusion time and on a varied gradient strength (G) is described by eq 2:

$$\ln \frac{I}{I_0} = -(\gamma\delta)^2 D_t \left(\Delta - \frac{\delta}{3}\right) G^2 \quad (2)$$

where I=intensity of the observed spin echo, $I_0$=intensity of the spin echo without gradients, $D_t$=diffusion coefficient, $\Delta$=delay between the midpoints of the gradients, $\delta$=length of the gradient pulse, and $\gamma$=magnetogyric ratio. For pure solvents, the diffusion coefficient $D_t$, which is directly proportional to the slope of the regression line obtained by plotting $\log(I/I_0)$ vs. $G^2$, was estimated by measuring the proportionality constant using an HDO sample (0.04%) in $D_2O$ (known diffusion coefficient in the range 274-318 K)[20] under the exact same conditions as the sample of interest [$D_t$ (CD$_2$Cl$_2$)=33.2×10$^{-10}$ m$^2$ s$^{-1}$, $D_t$(DMSO-d$_6$)=6.5×10$^{-10}$ m$^2$ s$^{-1}$]. Residual solvent signals where then used as internal standards to account for systematic changes in solution viscosity (i.e., the reported $D_t$ values refer to a hypothetical experiment carried out in a solution having the nominal reported concentration, but the viscosity of the pure solvent at that temperature), or random changes in the actual probe temperature as well as gradient strength reproducibility.

PGSE measurements were carried out for TMC-2 and TMC-3 in CD$_2$Cl$_2$ and DMSO-d$_6$ over a range of concentrations. Hydrodynamic radii of the diffusing particles ($r_H$) were derived from the experimentally determined A data using the Stokes-Einstein equation:

$$D_t = \frac{kT}{6\pi\eta r_H \left(\frac{f}{f_0}\right)} \quad (3)$$

where k is the Boltzman constant, T is the temperature, $\eta$ is the solution viscosity. The $f/f_0$ ratio is introduced to take into account the ellipsoidal shapes of TMC-2 and TMC-3, where f is the frictional coefficient of the ellipsoid and $f_0$ is that of a sphere having an equal volume. The $f/f_0$ ratio depends on the shape (prolate or oblate) and on the ratio of the major (a) to minor (b) axis of the ellipsoid. For prolate ellipsoid-like TMC-2, a/b≈2.9 and $f/f_0$≈1.1, while for TMC-3, a/b≈4.1 and $f/f_0$≈1.2. From the hydrodynamic radii obtained, the hydrodynamic volumes ($V_H$) of the diffusing chromophores were calculated, and then compared with the van der Waals volumes ($V_{vdW}$) obtained from crystallographic data or molecular modeling. The $V_H/V_{vdW}$ ratio represents the aggregation number (N), similar to that defined by Pochapsky, and is useful in comparing trends over a range of concentrations.

Example 24

EFISH Measurements, and measurements of μβ. The products of the chromophore dipole moment (μ) and the projection of $\beta_{vec}$, the vector part of the first hyperpolarizability ($\beta$) tensor along the direction μ were performed by solution-phase DC electric-field-induced second-harmonic (EFISH) generation methods,[25] which provide direct information on the intrinsic molecular NLO properties via eq 4:

$$\gamma_{EFISH} = (\mu\beta_{vec}/5kT) + \gamma(-2\omega; \omega, \omega, 0) \quad (4)$$

where $\mu\beta_{vec}/5kT$ is the dipolar orientational contribution and $\gamma(-2\omega, \omega, \omega, 0)$, a third-order term at frequency $\omega$ of the incident light, is the electronic contribution to $\gamma_{EFISH}$, which is negligible for molecules of the type investigated here.

EFISH measurements were carried out in CH$_2$Cl$_2$ and DMF solutions over a considerable range of concentrations ($10^{-4}$-$10^{-6}$ M) at a nonresonant fundamental wavelength of 1907 nm, using a Q-switched, mode-locked Nd$^{3+}$:YAG laser (pulse durations of 15 ns (90 ns) at a 10 Hz repetition rate). The 1064 nm initial wavelength was shifted to 1907 nm by a Raman shifter with a high-pressure H$_2$ cell. Solutions were prepared under N$_2$. CH$_2$Cl$_2$ was freshly distilled from CaCl$_2$. The organic base 1,4-diaza-bicyclo[2.2.2]octane (DABCO) (molar ratio DABCO/compound equal to 0.5/1) was added to the solutions to increase the chromophore stability. The μβ values reported are the averages of 16 successive measurements performed on each sample. The standard deviation was never greater than 22%.

Example 25

In Situ Poling and Direct Electro-Optic Measurements on TMC-Containing Guest-Host Polymer Thin Films. The effective electro-optic coefficient, $r_{33}$, of poled TMC-based guest-host materials was measured using the Teng-Man reflection technique. A 633 nm He—Ne laser is used for alignment of optical components, and a CW diode laser at 1310 nm (TEC) is used as the working laser source. The laser beam (1310 nm) travels through a polarizer, where the orientation is set at 45° with respect to the laser incident plane, and then passes through the transparent conducting oxide (TCO) top electrode, and then the EO-active thin film before being reflected by the bottom gold electrode. The reflected laser beam travels through a compensator, then an analyzer, which is cross-polarized with respect to the polarizer. The signals are collected by a detector, and then monitored by an oscilloscope and a lock-in amplifier. Apertures are used for collimation purposes. The sample is mounted under an N$_2$ flow on a temperature-controlled heated stage with good thermal contact. An AC modulation voltage, amplifying the input signal from a signal generator, is applied to the sample with frequency of 1 KHz, with the amplitude ranging from 1.0 to 10 V. A DC bias generated by the high voltage amplifier is applied to the sample, with a microampere meter monitoring the poling current (~10 μA). In the present experiments, assuming $r_{33}=3r_{13}$, $r_{33}$ is derived from eq 5,[28]

$$r_{33} = \frac{3\sqrt{2}}{4} \frac{\lambda}{\pi} \frac{1}{V_M} \frac{V_{AC}}{V_{DC}} \frac{\sqrt{n^2 - \sin^2\theta}}{n^2 \sin^2\theta} \quad (5)$$

We claim:

1. A chromophore compound of a formula

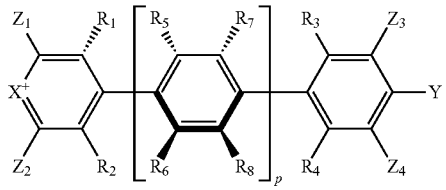

wherein X is selected from the group consisting of NR', O, PR' and S; each of R', $R_1$-$R_4$, $R_5$-$R_8$, and $Z_1$-$Z_4$ is independently selected from the group consisting of linear alkyl, substituted linear alkyl, branched alkyl, substituted branched alkyl, cycloalkyl, substituted cycloalkyl aryl, heterocycle, alkylaryl, alkylheterocycle and arylheterocycle moieties; p is an integer greater than 0; and Y comprises a substituent comprising a moiety selected from anionic carbon and heteroatom moieties; and salts, conjugate acids and charge-transfer isomers thereof.

2. The compound of claim 1 wherein p is >1; X is NR'; and each of R', $R_1$-$R_4$, $R_5$-$R_8$ and $Z_1$-$Z_4$ is independently selected from the group consisting of linear alkyl and branched alkyl moieties.

3. The compound of claim 2 wherein Y is a substituent selected from O⁻ and $(Ew_1)(Ew_2)C^-$ moieties, where $Ew_1$ and $Ew_2$ are selected from electron withdrawing substituents.

4. The compound of claim 1 wherein Y comprises a substituent of a formula

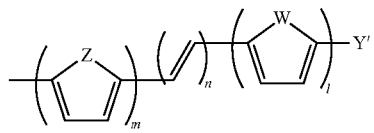

wherein z and w are independently selected from the group consisting of S, O, NR" and CH=CH, and R" is selected from the group consisting of linear alkyl, substituted linear alkyl, branched alkyl, substituted branched alkyl, cycloalkyl and substituted cycloalkyl moieties; m, n and l are independently selected from 0 and integers greater than 0, provided at least one of said m, n and l is at least 1; and Y' is selected from the group consisting of anionic carbon and heteroatom moieties.

5. The compound of claim 1 in a composition comprising a polymeric film.

6. The compound of claim 5 incorporated into an electro-optic device.

* * * * *

UNITED STATES PATENT AND TRADEMARK OFFICE
CERTIFICATE OF CORRECTION

PATENT NO. : 8,349,222 B2
APPLICATION NO. : 13/169638
DATED : January 8, 2013
INVENTOR(S) : Tobin J. Marks and Hu Kang It is certified that error appears in the above-identified patent and that said Letters Patent is hereby corrected as shown below:

Column 26, Line 13:

" $K_d = \dfrac{c_D}{c^2_M} = \dfrac{1-\alpha}{2\alpha^2 c_0}$ " should read -- $K_d = \dfrac{c_D}{c_M{}^2} = \dfrac{1-\alpha}{2\alpha^2 c_0}$ --.

Signed and Sealed this
Twelfth Day of March, 2013

Teresa Stanek Rea
*Acting Director of the United States Patent and Trademark Office*

UNITED STATES PATENT AND TRADEMARK OFFICE
CERTIFICATE OF CORRECTION

PATENT NO. : 8,349,222 B2
APPLICATION NO. : 13/169638
DATED : January 8, 2013
INVENTOR(S) : Tobin J. Marks et al.

Page 1 of 1

It is certified that error appears in the above-identified patent and that said Letters Patent is hereby corrected as shown below:

In the Specification:

Column 1, lines 15-19
"This invention was made with government support under Grant Number N00014-04-1-0093 awarded by the Office of Naval Research and under Grant Number DMR-0076077 awarded by the National Science Foundation. The government has certain rights in the invention." should read --This invention was made with government support under grant number N00014-04-1-0093 awarded by the Office of Naval Research and grant number DMR-0076097 awarded by the National Science Foundation. The government has certain rights in the invention.--

Signed and Sealed this
Twenty-sixth Day of August, 2014

Michelle K. Lee
*Deputy Director of the United States Patent and Trademark Office*